(12) United States Patent
Zorgui et al.

(10) Patent No.: US 11,889,426 B2
(45) Date of Patent: Jan. 30, 2024

(54) POWER CONTROL TECHNIQUES FOR COOPERATIVE SENSING

(71) Applicant: QUALCOMM Incorporated, San Diego, CA (US)

(72) Inventors: Marwen Zorgui, San Diego, CA (US); Srinivas Yerramalli, Hyderabad (IN); Wooseok Nam, San Diego, CA (US); Yucheng Dai, San Diego, CA (US); Tao Luo, San Diego, CA (US); Junyi Li, Fairless Hills, PA (US); Peter Gaal, San Diego, CA (US); Sony Akkarakaran, Poway, CA (US); Rajat Prakash, San Diego, CA (US); Roohollah Amiri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 17/346,650

(22) Filed: Jun. 14, 2021

(65) Prior Publication Data

US 2022/0400445 A1 Dec. 15, 2022

(51) Int. Cl.
*H04W 52/14* (2009.01)
*H04W 52/36* (2009.01)
*H04W 52/42* (2009.01)
*H04W 74/08* (2009.01)

(52) U.S. Cl.
CPC ......... *H04W 52/143* (2013.01); *H04W 52/36* (2013.01); *H04W 52/42* (2013.01); *H04W 74/0816* (2013.01)

(58) Field of Classification Search
CPC ....... G01S 7/415; G01S 13/04; H04W 52/143
See application file for complete search history.

(56) References Cited

U.S. PATENT DOCUMENTS

| | | | | |
|---|---|---|---|---|
| 8,213,979 B1 * | 7/2012 | Shetty | ................... | H04W 52/12 375/252 |
| 9,019,148 B1 * | 4/2015 | Bikhazi | ................... | G01S 13/56 342/28 |
| 2002/0130807 A1 * | 9/2002 | Hall | ........................ | G01S 13/04 340/552 |
| 2012/0282970 A1 * | 11/2012 | Kela | ................... | H04W 52/248 455/522 |
| 2016/0365886 A1 * | 12/2016 | Prendergast | .......... | H04W 52/18 |

(Continued)

FOREIGN PATENT DOCUMENTS

WO  WO-2018205435 A1 * 11/2018 ........... H04B 7/0408

OTHER PUBLICATIONS

English Translation of WO-201805435-A1 (Year: 2018).*

*Primary Examiner* — James P Duffy
(74) *Attorney, Agent, or Firm* — Holland & Hart LLP

(57) ABSTRACT

Methods, systems, and devices for wireless communications are described. A user equipment (UE) may transmit a first sensing signal of a radio frequency (RF) sensing procedure at a first transmit power. The UE may receive, from a base station at least in part in response to the first sensing signal, a power control message for sensing signals of the RF sensing procedure. The power control message may indicate a power control strategy for transmitting sensing signals of the RF sensing procedure. The UE may then transmit, at a second transmit power based on the received power control message, a second sensing signal of the RF sensing procedure.

30 Claims, 16 Drawing Sheets

(56) References Cited

U.S. PATENT DOCUMENTS

| | | |
|---|---|---|
| 2019/0190668 A1* | 6/2019 | Lei ........................ H04L 1/0017 |
| 2020/0185966 A1* | 6/2020 | Asanuma ................ H02J 50/80 |
| 2022/0308194 A1* | 9/2022 | Zhang ..................... G01S 7/006 |

* cited by examiner

POWER CONTROL TECHNIQUES FOR COOPERATIVE SENSING

INTRODUCTION

The following relates to wireless communications, and more specifically to techniques for power control management for radio frequency (RF) sensing procedures.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a UE is described. The method may include transmitting, at a first transmit power, a first sensing signal of an RF sensing procedure. The method may further include receiving, from a base station at least in part in response to the first sensing signal, a power control message for sensing signals of the RF sensing procedure, and transmitting, at a second transmit power based on the received power control message, a second sensing signal of the RF sensing procedure.

An apparatus for wireless communication at a UE is described. The apparatus may include a processor, and memory coupled to the processor. The processor and memory may be configured to transmit, at a first transmit power, a first sensing signal of an RF sensing procedure. The processor and memory may further be configured to receive, from a base station at least in part in response to the first sensing signal, a power control message for sensing signals of the RF sensing procedure, and transmit, at a second transmit power based on the received power control message, a second sensing signal of the RF sensing procedure.

Another apparatus for wireless communication at a UE is described. The apparatus may include means for transmitting, at a first transmit power, a first sensing signal of an RF sensing procedure. The apparatus may further include means for receiving, from a base station at least in part in response to the first sensing signal, a power control message for sensing signals of the RF sensing procedure, and means for transmitting, at a second transmit power based on the received power control message, a second sensing signal of the RF sensing procedure.

A non-transitory computer-readable medium storing code for wireless communication at a UE is described. The code may include instructions executable by a processor to transmit, at a first transmit power, a first sensing signal of an RF sensing procedure. The code may further include instructions executable by a processor to receive, from a base station at least in part in response to the first sensing signal, a power control message for sensing signals of the RF sensing procedure, and transmit, at a second transmit power based on the received power control message, a second sensing signal of the RF sensing procedure.

Some examples of the method, apparatuses, and non-transitory computer-readable medium described herein may further include operations, features, means, or instructions for receiving, via the power control message, an indication of the second transmit power, where transmitting the second sensing signal may be based on the indication of the second transmit power.

Some examples of the method, apparatuses, and non-transitory computer-readable medium described herein may further include operations, features, means, or instructions for receiving, via the power control message, an indication that the UE is to adjust a transmit power for the RF sensing procedure and adjusting a transmit power of the RF sensing procedure from the first transmit power to the second transmit power, where transmitting the second sensing signal may be based on adjusting the transmit power. In some examples, the UE may adjust the transmit power by performing a power ramping procedure.

Some examples of the method, apparatuses, and non-transitory computer-readable medium described herein may further include operations, features, means, or instructions for receiving, from the base station, control signaling indicating a set of power ramping procedures including the power ramping procedure, where the power ramping procedure may be included within the set of power ramping procedures.

In some examples of the method, apparatuses, and non-transitory computer-readable medium described herein, the power ramping procedure includes a fixed power ramping procedure, a linear power ramping procedure, a geometric power ramping procedure, or any combination thereof.

Some examples of the method, apparatuses, and non-transitory computer-readable medium described herein may further include operations, features, means, or instructions for receiving, from the base station, a second power control message indicating that the UE may be to stop performing the power ramping procedure and transmitting, at a default transmit power based on the received second power control message, a third sensing signal of the RF sensing procedure.

Some examples of the method, apparatuses, and non-transitory computer-readable medium described herein may further include operations, features, means, or instructions for receiving, via the power control message, an indication of a time interval for the power ramping procedure and performing the power ramping procedure to adjust the transmit power of the RF sensing procedure for at least a portion of the time interval.

Some examples of the method, apparatuses, and non-transitory computer-readable medium described herein may further include operations, features, means, or instructions for receiving, from the base station, control signaling indicating an initial transmit power, the first transmit power including the initial transmit power.

Some examples of the method, apparatuses, and non-transitory computer-readable medium described herein may further include operations, features, means, or instructions for receiving, from the base station, control signaling indicating a path loss model for RF sensing procedures at the UE, where transmitting the first sensing signal at the first transmit power may be based on the indicated path loss model.

Some examples of the method, apparatuses, and non-transitory computer-readable medium described herein may further include operations, features, means, or instructions for receiving a reference signal from the base station, performing a channel estimation procedure based on the received reference signal and in accordance with the indicated path loss model, and determining the first transmit power based on performing the channel estimation procedure.

Some examples of the method, apparatuses, and non-transitory computer-readable medium described herein may further include operations, features, means, or instructions for determining the first transmit power based on a target range of one or more objects detected via the RF sensing procedure.

Some examples of the method, apparatuses, and non-transitory computer-readable medium described herein may further include operations, features, means, or instructions for receiving, via the power control message, an indication of one or more beams of the UE, where transmitting the second sensing signal includes transmitting the second sensing signal using at least a subset of the one or more beams based on the indication of the one or more beams.

Some examples of the method, apparatuses, and non-transitory computer-readable medium described herein may further include operations, features, means, or instructions for receiving, from the base station, control signaling indicating one or more parameters for the RF sensing procedure, where transmitting the first sensing signal, transmitting the second sensing signal, or both, may be based on the one or more parameters.

In some examples of the method, apparatuses, and non-transitory computer-readable medium described herein, the one or more parameters include a bandwidth for the sensing signals of the RF sensing procedure, a set of one or more sensing occasions for the sensing signals of the RF sensing procedure, a set of one or more pulse repetition intervals for the RF sensing procedure, a time interval for the RF sensing procedure, a maximum transmission power for the sensing signals of the RF sensing procedure, a target range for one or more objects detected via the RF sensing procedure, a location of the one or more objects, or any combination thereof.

A method for wireless communication at a base station is described. The method may include receiving a first sensing signal of an RF sensing procedure. The method may further include transmitting, to a UE at least in part in response to the first sensing signal, a power control message for sensing signals to be transmitted by the UE in the RF sensing procedure. The method may further include receiving, at least in part in response to the transmitted power control message, a second sensing signal of the RF sensing procedure, and identifying one or more objects based on receiving the second sensing signal.

An apparatus for wireless communication at a base station is described. The apparatus may include a processor, and memory coupled to the processor. The processor and memory may be configured to receive a first sensing signal of an RF sensing procedure. The processor and memory may be further configured to transmit, to a UE at least in part in response to the first sensing signal, a power control message for sensing signals to be transmitted by the UE in the RF sensing procedure. The processor and memory may be further configured to receive, at least in part in response to the transmitted power control message, a second sensing signal of the RF sensing procedure.

Another apparatus for wireless communication at a base station is described. The apparatus may include means for receiving a first sensing signal of an RF sensing procedure, and means for transmitting, to a UE at least in part in response to the first sensing signal, a power control message for sensing signals to be transmitted by the UE in the RF sensing procedure. The apparatus may further include means for receiving, at least in part in response to the transmitted power control message, a second sensing signal of the RF sensing procedure, and means for identifying one or more objects based on receiving the second sensing signal.

A non-transitory computer-readable medium storing code for wireless communication at a base station is described. The code may include instructions executable by a processor to receive a first sensing signal of an RF sensing procedure, and transmit, to a UE at least in part in response to the first sensing signal, a power control message for sensing signals to be transmitted by the UE in the RF sensing procedure. The code may further include instructions executable by a processor to receive, at least in part in response to the transmitted power control message, a second sensing signal of the RF sensing procedure.

Some examples of the method, apparatuses, and non-transitory computer-readable medium described herein may further include operations, features, means, or instructions for transmitting, via the power control message, an indication of the second transmit power, where receiving the second sensing signal may be based on the indication of the second transmit power.

Some examples of the method, apparatuses, and non-transitory computer-readable medium described herein may further include operations, features, means, or instructions for transmitting, via the power control message, an indication that the UE may be to perform a power ramping procedure for the RF sensing procedure, where receiving the second sensing signal may be based on performing the power ramping procedure.

Some examples of the method, apparatuses, and non-transitory computer-readable medium described herein may further include operations, features, means, or instructions for transmitting, to the UE, control signaling indicating a set of power ramping procedures including the power ramping procedure, where the power ramping procedure may be included within the set of power ramping procedures.

Some examples of the method, apparatuses, and non-transitory computer-readable medium described herein may further include operations, features, means, or instructions for transmitting, to the UE, a second power control message indicating that the UE may be to stop performing the power ramping procedure and receiving, at a default transmit power based on the transmitted second power control message, a third sensing signal of the RF sensing procedure.

Some examples of the method, apparatuses, and non-transitory computer-readable medium described herein may further include operations, features, means, or instructions for transmitting, to the UE, control signaling indicating an initial transmit power, the first transmit power including the initial transmit power.

Some examples of the method, apparatuses, and non-transitory computer-readable medium described herein may further include operations, features, means, or instructions for transmitting, to the UE, control signaling indicating a path loss model for RF sensing procedures at the UE, where receiving the first sensing signal at the first transmit power may be based on the indicated path loss model.

DETAILED DESCRIPTION

Figure 1:
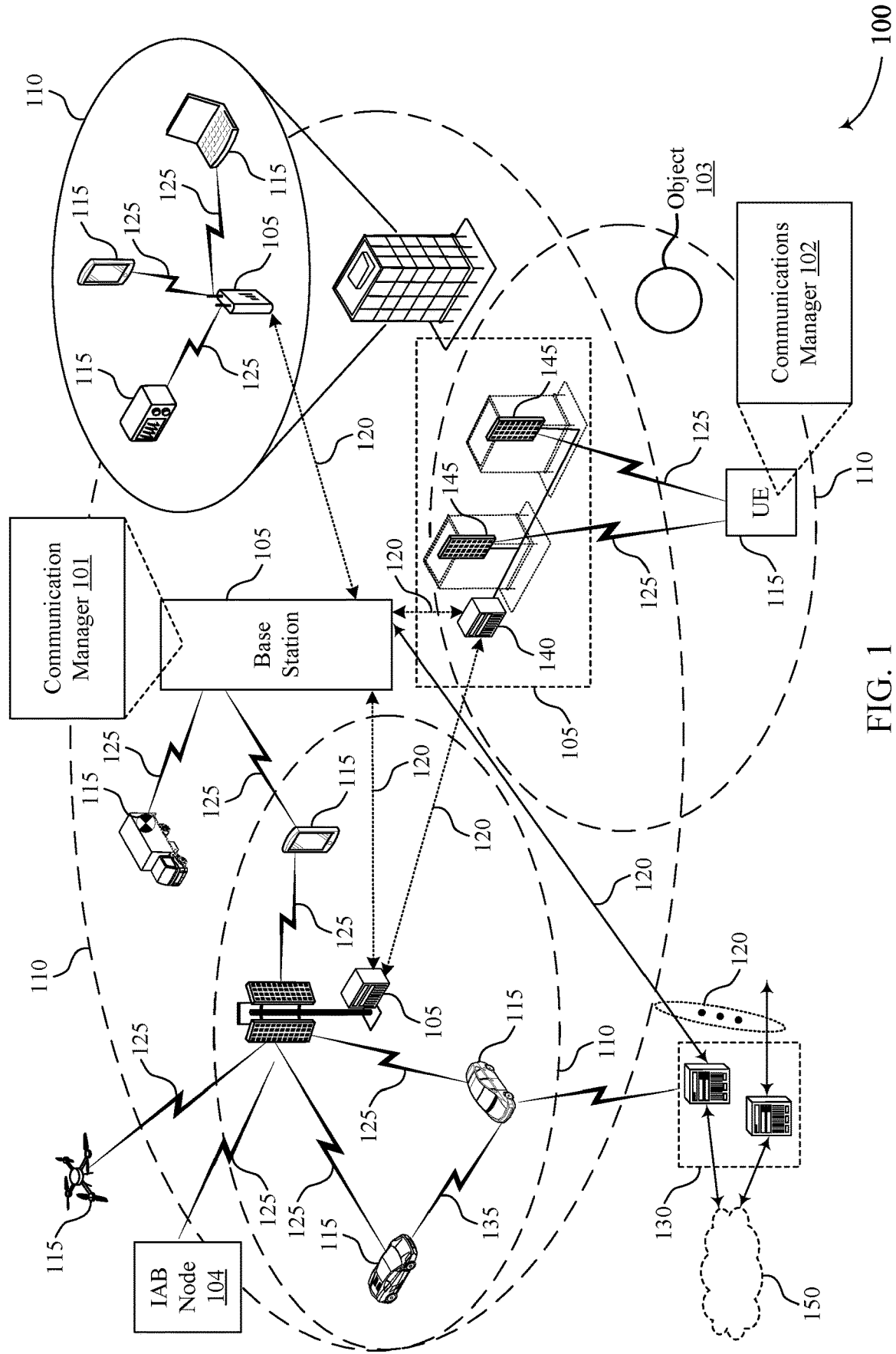
FIG. 1 illustrates an example of a wireless communications system that supports power control techniques for cooperative sensing in accordance with one or more aspects of the present disclosure.

In some wireless communications systems, wireless devices (e.g., UEs, base stations) may use RF sensing procedures. As it is used herein, the term "RF sensing procedure" may be used to refer to procedures in which one or more wireless devices transmit sensing signals which are reflected or refracted off objects in order to identify the presence of the objects, determine a direction/velocity of the objects, track the objects, and the like. In some implementations, an RF sensing procedure may be performed between two or more wireless devices (e.g., transmitting device, receiving device), in which case the RF sensing procedure may be referred to as a "cooperative RF sensing procedure" or "cooperative sensing." During an RF sensing procedure, a transmitting device transmits RF sensing signals (e.g., mmW signals), which may be reflected off objects and received by a receiving device (e.g., the transmitting wireless device, or one or more other wireless devices). The receiving device may determine time delays, phase shifts, and other parameters associated with the received sensing signals to identify one or more characteristics of the objects (e.g., position, location, distance, etc.). The sensing range of the sensing signals (e.g., range within which object may be identified via the RF sensing operation) may be a function of several parameters, including a transmit power of the sensing signals, antenna gain, bandwidth, wavelength, a length of cyclic prefixes, and the like.

In monostatic RF sensing procedures, a single wireless device may be configured to both transmit the sensing signals, and receive the sensing signals reflected/refracted off objects (e.g., single device acts as co-located Tx/Rx device). Comparatively, in bistatic RF sensing procedures (cooperative sensing), sensing signals may be transmitted and received by two different wireless devices (e.g., non co-located Tx and Rx devices). Moreover, in multi-static RF sensing procedures (cooperative sensing), a single wireless device (e.g., single Tx device) may transmit sensing signals which are received by multiple receiving devices (e.g., multiple Rx devices). In the context of bistatic and/or multi-static RF sensing procedures in which the transmitting device is different from the receiving device, the transmitting device may not know if it is transmitting sensing signals with too much or too little power, which may result in increased interference attributable to the sensing signals.

Accordingly, aspects of the present disclosure provide techniques for RF sensing procedures. In particular, aspects of the present disclosure support configurations and signaling which enable a transmitting device (e.g., UE) to determine an initial transmit power for sensing signals of an RF sensing procedure, and to control (e.g., selectively adjust) the transmit power throughout the RF sensing procedure. For example, a UE may transmit a first sensing signal of an RF sensing procedure with a first transmit power. The UE may then receive a power control message from a base station in response to the first sensing signal, and may adjust a transmit power of the RF sensing procedure to transmit a second sensing signal with a second (e.g., different) transmit power based on the power control message. This power control signaling exchanged between the base station and the UE may facilitate coordination between the respective devices throughout the RF sensing procedure, which may enable efficient, cooperative sensing between the respective devices.

In some aspects, the UE may be configured (e.g., via radio resource control (RRC) signaling from the base station) with a path loss model which may be used to perform channel estimation and determine an initial transmit power for sensing signals of the RF sensing procedure. In some cases, the power control message may explicitly indicate a transmit power which is to be used for subsequent sensing signals. In other cases, the power control message may indicate a power ramping procedure which is to be used by the UE to selectively increase/decrease the transmit power of the sensing operation. In some aspects, the UE may be pre-configured (e.g., via RRC signaling) with multiple power ramping procedures (e.g., fixed power ramping procedure, linear power ramping procedure, geometric power ramping procedure), where the power control message indicates which power ramping procedure is to be implemented. The UE may apply the power ramping procedure to selectively adjust the transmit power for sensing signals for a fixed time duration, or until additional power control messages are received.

Aspects of the disclosure are initially described in the context of wireless communications systems. Additional aspects of the disclosure are also described in the context of an example process flow. Aspects of the disclosure are further illustrated by and described with reference to apparatus diagrams, system diagrams, and flowcharts that relate to power control techniques for cooperative sensing.

FIG. 1 illustrates an example of a wireless communications system 100 that supports power control techniques for cooperative sensing in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology. The base stations 105 may each include a communication manager 101 configured to facilitate communications with the respective devices (e.g., base stations 105 of the wireless communications system 100.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. In some implementations, the UEs 115 may be or include disaggregated UEs 115 in which one or more of the various functions and communication layers of the UE 115 may be split between multiple physical devices for communication between UEs 115 and base stations 105. In such cases, the disaggregated UE 115 may include the respective physical devices configured to perform various functions and communications, for example to perform one or more of the signaling and power control techniques for RF sensing procedures described herein.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1. The UEs 115 may each include a communication manager 102 configured to facilitate communications with the respective devices of the wireless communications system 100.

The UEs 115 and the base stations 105 may wirelessly communicate with one another via one or more communication links 125 over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the RF spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a RF spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications, or critical communications, may include private communication or group communication and may be supported by one or more services such as push-to-talk (PTT), video (Video), or data (Data). Support for such functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed RF spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support RF beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or RF beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), highest signal-to-interference-plus-noise ratio (SINR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

Techniques described herein, in addition to or as an alternative to be carried out between UEs 115 and base stations 105, may be implemented via additional or alternative wireless devices, including IAB nodes 104, distributed units (DUs), centralized units (CUs), and the like. For example, in some implementations, aspects described herein may be implemented in the context of a disaggregated radio access network (RAN) architecture (e.g., open RAN architecture). For instance, some wireless communications systems (e.g., wireless communications system 100), infrastructure and spectral resources for NR access may additionally support wireless backhaul link capabilities in supplement to wireline backhaul connections, providing an IAB network architecture. One or more base stations may include CUs and DUs and may be referred to as donor base stations 105. One or more DUs associated with a donor base station may be partially controlled by CUs associated with the donor base station. The one or more donor base stations (e.g., IAB donors) may be in communication with one or more additional base stations (e.g., IAB nodes 104) via supported access and backhaul links. IAB nodes 104 may support mobile terminal (MT) functionality controlled and/or scheduled by DUs of a coupled IAB donor. In addition, the IAB nodes 104 may include DUs that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to perform the signaling and power control techniques for RF sensing procedures described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of base stations 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU and at least one DU, where the CU may communicate with the core network 130 over an NG interface (e.g., some backhaul link). The CU may host layer 3 (L3) (e.g., RRC, service data adaption protocol (SDAP), PDCP, etc.) functionality and signaling. The at least one DU may host lower layer, such as layer 1 (L1) and layer 2 (L2) (e.g., RLC, MAC, physical (PHY), etc.) functionality and signaling, and may each be at least partially controlled by the CU. The DU may support one or multiple different cells. IAB donor and IAB nodes 104 may communicate over an F1 interface according to some protocol that defines signaling messages (e.g., F1-AP protocol). Additionally, CU may communicate with the core network over an NG interface (which may be an example of a portion of backhaul link), and may communicate with other CUs (e.g., a CU associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU and an MT. A DU may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs) may provide a Uu interface for a parent node to signal to a child IAB node 104 or UE 115.

For example, IAB node may be referred to a parent node associated with IAB node, and a child node associated with IAB donor. The IAB donor may include a CU with a wireline (e.g., optical fiber) or wireless connection to the core network, and may act as parent node to IAB nodes 104. For example, the DU of IAB donor may relay transmissions to UEs 115-*c* and 115-*d* through IAB nodes, and may directly signal transmissions to the UE 115-*b*. The CU of IAB donor may signal communication link establishment via an F1 interface to IAB nodes, and the IAB nodes 104 may schedule transmissions (e.g., transmissions to the UEs 115 relayed from the IAB donor) through the DUs. That is, data may be relayed to and from IAB nodes 104 via signaling over an NR Uu interface to MT of the IAB node 104. Communications with IAB node may be scheduled by DU of IAB donor and communications with IAB node 104 may be scheduled by DU of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to perform the signaling and power control techniques for RF sensing procedures described herein.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support RF sensing procedures. RF sensing procedures may utilize sensing signals (e.g., mmW) to enable touchless and/or device-free interaction with a device or system. As noted previously herein, RF sensing procedures may be used to identify objects, determine object direction/velocity, track objects, and the like. For example, RF sensing procedures may be used in the context of health monitoring (e.g., heartbeat detection, respiration rate monitoring), gesture recognition (e.g., human activity recognition, keystroke detection, sign language recognition), contextual information acquisition (e.g., location detection, location tracking, direction finding, range estimation), automotive sensing (e.g., smart cruise control, collision avoidance), and the like.

During an RF sensing procedure, a transmitting device transmits RF sensing signals (e.g., mmW signals), which may be reflected off objects and received by a receiving device (e.g., the transmitting wireless device, or one or more other wireless devices). The receiving device may determine time delays, phase shifts, and other parameters associated with the received sensing signals to identify a position, location, distance, or any combination, of the objects.

The sensing range (e.g., "maximum allowable range") of the sensing signals (e.g., range within which object may be identified via the RF sensing operation) may be a function of several parameters, including a transmit power of the sensing signals. For example, a maximum allowable range of an RF sensing procedure may be limited by SNR-related parameters, a reference signal density of sensing signals in the frequency domain ($M_f$), and a cyclic prefix (CP) length. SNR-related parameters may include a transmit power (Tx power), Tx/Rx antenna gain, bandwidth of the sensing signals, quantity of OFDM symbols across which sensing signals are transmitted, a cross section of the sensing signals (e.g., cross section/area of object reflecting the sensing signals), frequency/wavelength of the sensing signals, a required SNR (SNRreq), or any combination thereof.

The wireless communications system 100 may support multiple types of RF sensing procedures, including monostatic RF sensing procedures, bistatic RF sensing procedures, and multi-static RF sensing procedures. As noted previously herein, RF sensing procedures performed between two or more wireless devices (e.g., bistatic RF sensing procedures, multi-static RF sensing procedures) may be referred to as "cooperative RF sensing procedures" or "cooperative sensing procedures."

In the context of monostatic RF sensing procedures, a single wireless device may be configured to both transmit the sensing signals, and receive the sensing signals reflected/refracted off objects, such as object 103. As such, monostatic RF sensing may include a single co-located device which acts as both a Tx and Rx device. Devices configured to perform monostatic RF sensing procedures may be capable of performing full-duplex communications. Additionally, devices configured to perform monostatic RF sensing procedures may exhibit good isolation capabilities between transmitting and receiving antenna arrays, which may increase the complexity of monostatic RF sensing procedures.

Comparatively, in bistatic RF sensing procedures, sensing signals may be transmitted and received by two different wireless devices (e.g., non co-located Tx and Rx devices). As compared to monostatic RF sensing procedures, bistatic RF sensing procedures do not require wireless devices (e.g., Tx devices, Rx devices) to be capable of performing full-duplex communications. However, Tx and Rx devices may perform time synchronization procedures (e.g., time offset estimation) in order to perform bistatic RF sensing procedures.

Moreover, in multi-static RF sensing procedures, a single wireless device (e.g., single Tx device) may transmit sensing signals which are received by multiple receiving devices (e.g., multiple Rx devices). For example, in a gNB-based multi-static RF sensing procedure, one or more base stations 105 (e.g., Tx device) may transmit sensing signals, where the receiving devices for the sensing signals may include other base stations 105 and/or UEs 115 with known locations. By way of another example, in a UE-based multi-static RF sensing procedure, a UE 115 may transmit sensing signals (e.g., Tx device), where the receiving devices for the sensing signals may include base stations 105 and/or UEs 115 with known locations. In UE-based multi-static RF sensing procedures, Tx and Rx UEs 115 may utilize sidelink communications for positioning and data communication.

In the context of bistatic RF sensing and/or multi-static RF sensing procedures in which the transmitting device is different from the receiving device, the transmitting device may not know if it is transmitting sensing signals with too much or too little power, which may result in increased interference attributable to the sensing signals.

The UEs 115 and base stations 105 of the wireless communications system 100 may support techniques for RF sensing procedures. In particular, the UEs 115 and the base stations 105 of the wireless communications system 100 may support configurations and signaling which enable a transmitting device (e.g., UE 115) to determine an initial transmit power for sensing signals of an RF sensing procedure, and to control (e.g., selectively adjust) the transmit power throughout the RF sensing procedure. For example, in the context of a bistatic RF sensing procedure, a UE 115 may transmit a first sensing signal of an RF sensing procedure with a first transmit power. The UE 115 may then receive a power control message from a base station 105 in response to the first sensing signal, and may adjust a transmit power of the RF sensing procedure to transmit a second sensing signal with a second (e.g., different) transmit power based on the power control message.

In some aspects, the UE 115 may be configured (e.g., via RRC signaling from the base station 105) with a path loss model which may be used to perform channel estimation and determine an initial transmit power for sensing signals of the RF sensing procedure. In some cases, the power control message may explicitly indicate a transmit power which is to be used for subsequent sensing signals. In other cases, the power control message may indicate a power ramping procedure which is to be used by the UE 115 to selectively increase/decrease the transmit power of the sensing operation. In some aspects, the UE 115 may be pre-configured (e.g., via RRC signaling) with multiple power ramping procedures (e.g., fixed power ramping procedure, linear power ramping procedure, geometric power ramping procedure), where the power control message indicates which power ramping procedure is to be implemented. The UE 115 may apply the power ramping procedure to selectively adjust the transmit power for sensing signals for a fixed time duration, or until additional power control messages are received.

Techniques described herein may enable power control techniques for cooperative RF sensing procedures performed between two or more wireless devices. In particular, techniques described herein may enable UEs 115 to determine an initial transmit power for RF sensing procedures via open-loop power control techniques, and may enable base stations 105 to selectively adjust transmit powers of RF sensing procedures via closed-loop power control techniques. By enabling power control techniques for cooperative RF sensing procedures, aspects of the present disclosure may enable efficient and reliable determination of objects 103 via the RF sensing procedures. Additionally, aspects of the present disclosure may reduce interference within the wireless communications system 100 which is attributable to sensing signals of RF sensing procedures, thereby reducing noise and improving resource utilization within the wireless communications system 100.

Figure 2:
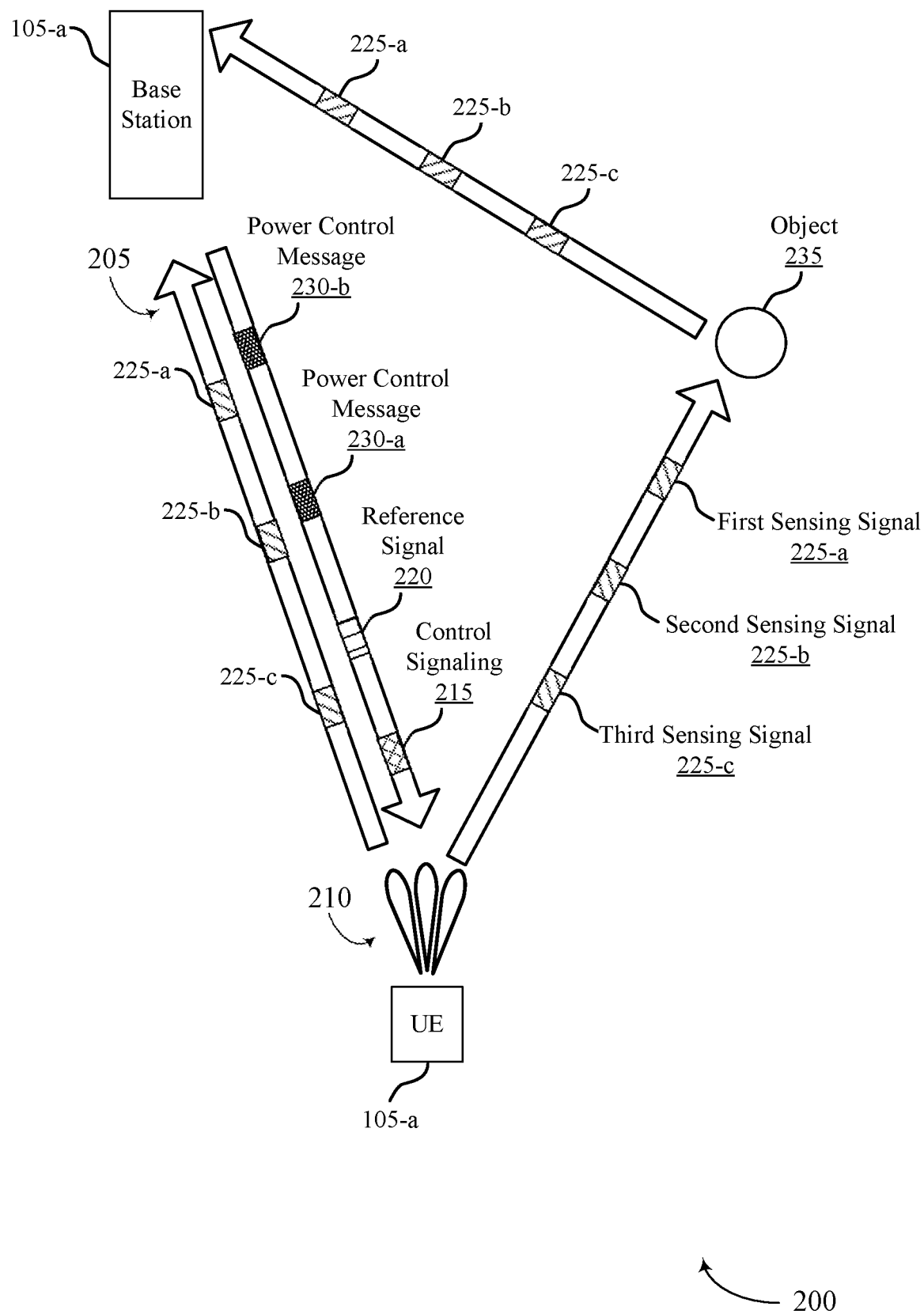
FIG. 2 illustrates an example of a wireless communications system that supports power control techniques for cooperative sensing in accordance with one or more aspects of the present disclosure.

FIG. 2 illustrates an example of a wireless communications system 200 that supports power control techniques for cooperative sensing in accordance with one or more aspects of the present disclosure. In some examples, wireless communications system 200 may implement, or be implemented by, aspects of wireless communications system 100. The wireless communications system 200 may include a UE 115-a and a base station 105-a, which may be examples of UEs 115 and base stations 105, as described with reference to FIG. 1.

The UE 115-a may communicate with the base station 105-a using a communication link 205, which may be an example of an NR or LTE link between the UE 115-a and the base station 105-a. In some cases, the communication link 205 may include an example of an access link (e.g., Uu link). The communication link may include a bi-directional link that enables both uplink and downlink communication. For example, the UE 115-a may transmit uplink signals, such as uplink control signals or uplink data signals, to the base station 105-a using the communication link 205, and the base station 105-a may transmit downlink signals, such as downlink control signals or downlink data signals, to the UE 115-a using the communication link 205.

In some aspects, the UE 115-a and the base station 105-a may communicate with one another using one or more beams, one or more carriers, one or more communications links, or any combination thereof. For example, as shown in FIG. 2, the UE 115-a may be configured to generate a set of beams 210 via one or more antenna modules and/or one or more antenna subarrays, where the beams 210 may facilitate wireless communications (e.g., uplink communications, downlink communications, or both) with the base station 105-a and other wireless devices.

In some aspects, UE 115-a and the base station 105-a of the wireless communications system 200 may support techniques for RF sensing procedures for the detection of one or more objects (e.g., object 235). In particular, the UEs 115 and the base stations 105 of the wireless communications system 100 may support configurations and signaling which enable a transmitting device (e.g., UE 115) to determine an initial transmit power for sensing signals of an RF sensing procedure, and to control (e.g., selectively adjust) the transmit power throughout the RF sensing procedure.

For example, the UE 115-a may receive control signaling 215 from the base station 105-a. The control signaling 215 may include an RRC message, a downlink control information (DCI) message, a synchronization signal block (SSB) message, a MAC-CE, or any combination thereof. In some cases, the control signaling 215 may be associated with cooperative sensing procedures (e.g., bistatic RF sensing procedure, multi-static RF sensing procedure) which may be performed between the UE 115-a and the base station 105-a. In this regard, the control signaling 215 may include information associated with performing RF sensing procedures at the UE 115-a, including a set of power ramping procedures which may be implemented at the UE 115-c, an initial transmit power for sensing signals 225 transmitted by the UE 115-a during a sensing procedure, a path loss model for RF sensing procedures at the UE 115-a, time/frequency resources for sensing signals 225 of the RF sensing procedure, and other parameters for performing RF sensing procedures at the UE 115-a.

For example, in some cases, the control signaling 215 may indicate a set of power ramping procedures which may be used by the UE 115-a to modify (e.g., selectively adjust) a transmit power associated with sensing signals 225 of an RF sensing procedure. The set of power ramping procedures may include fixed power ramping procedures, linear power ramping procedures, geometric power ramping procedures, or any combination thereof. By way of another example, the control signaling 215 may indicate a path loss model (e.g., propagation model) which may be used by the UE 115-a to perform channel estimation and determine an initial transmit power for sensing signals 225 of an RF sensing procedure. Additionally, or alternatively, the control signaling 215 may explicitly indicate an initial transmit power which is to be used by the UE 115-a to transmit a first sensing signal 225 of an RF sensing procedure.

By way of another example, the control signaling 215 may indicate one or more parameters associated with an RF sensing procedure to be performed at the UE 115-a. Parameters associated with the RF sensing procedure may include a bandwidth for sensing signals 225 of the RF sensing procedure, a set of sensing occasions for transmitting sensing signals 225 of the RF sensing procedure, a set of pulse repetition intervals for the RF sensing procedure, a time interval for performing the RF sensing procedure, a maximum transmit power for sensing signals 225 of the RF sensing procedure, a target range of the object 235, a location of the object 235, or any combination thereof.

In some implementations, the UE 115-a may receive a reference signal 220 from the base station 105-a. The reference signal 220 may include, but is not limited to, a CSI-RS. In some cases, the UE 115-a may receive the reference signal 220 based on receiving the control signaling 215 associated with RF sensing procedures. For example, in some cases, the UE 115-a may receive the reference signal 220 for performing a channel estimation of a channel between the UE 115-a and the base station 105-a, where the channel estimation may be used to determine an initial transmit power for sensing signals 225 of an RF sensing procedure during open-loop power control for the RF sensing procedure.

The UE 115-a may perform a channel estimation procedure based on the reference signal 220 received from the base station 105-a. In this regard, the UE 115-a may perform a channel estimate of a channel between the UE 115-a and the base station 105-a by performing measurements (e.g., received signal strength indicator (RSSI), reference signal received power (RSRP), reference signal received quality (RSRQ), SNR, SINR, channel quality indicator (CQI)) on the reference signal 220.

In some cases, the UE 115-a may perform the channel estimation procedure based on (e.g., in accordance with) a path loss model configured at the UE 115-a or signaled to the UE 115-a via the base station 105-a. For example, as noted previously herein, the UE 115-a may receive an indication of a path loss model for RF sensing procedures via the control signaling 215. In this example, the UE 11-c may perform the channel estimation procedure based on the reference signal 220 and in accordance with the indicated path loss model. In particular, the UE 115-a may estimate path loss between the UE 115-a and the base station based on measurements (e.g., RSSI) performed on the reference signal 220 and channel reciprocity for communications from the base station 105-a to the UE 115-a, and vice versa.

In additional or alternative cases (e.g., monostatic RF sensing cases), the UE 115-a may be pre-configured with a path loss model and/or propagation model, and may therefore perform the channel estimation procedure using its own path loss model and without explicit signaling from the base station 105-a. In such cases, the UE 115-a may perform the channel estimation procedure using its own path loss model/propagation model (e.g., cluster-based model, free-space propagation model) adapted to the sensing frequency of the sensing signals 225 and/or a sensing target range signaled to the UE 115-a.

In some aspects, the UE 115-a may perform the channel estimation by estimating a power delay profile in the time domain. In other words, the UE 115-a may estimate different multipath components associated with communications between the UE 115-a and the base station 105-a and their respective magnitudes, phases, or both. The performance of channel estimation techniques in the time domain for RF sensing procedures may be contrasted to traditional signal power measurement techniques for data communications in which signal power estimation is carried out in the frequency domain.

In some aspects, the UE 115-a may determine a first transmit power (e.g., initial transmit power) for sensing signals 225 of the RF sensing procedure. The UE 115-a may determine the first transmit power for the RF sensing procedure based on receiving the control signaling 215, performing the channel estimation, or any combination thereof.

In some implementations, the UE 115-a may determine the first/initial transmit power for the RF sensing procedure based on open-loop power control techniques for RF sensing. In cases of open-loop power control, the Tx device (e.g., UE 115-a) may not yet have feedback from the Rx device (e.g., base station 105-a) to adjust the transmit power of the sensing signals 225. As such, using open-loop power control techniques, the UE 115-a may determine/choose an initial transmit power based on signal measurements (e.g., measurements on the reference signal 220), a target coverage range (e.g., target sensing range of object 235), a power budget, channel estimations, or any combination thereof.

For example, in some cases, the control signaling 215 may indicate a transmit power (e.g., initial transmit power, maximum transmit power) and other parameters (e.g., bandwidth, sensing occasions, pulse repetition intervals) as part of a configuration for RF sensing procedures at the UE 115-a. In this example, the UE 115-a may determine the first/initial transmit power based on the indication of the initial transmit power and/or maximum transmit power indicated via the control signaling 215. By way of another example, the UE 115-a may determine the initial transmit power for the RF sensing procedure based on a channel estimation performed on the channel between the UE 115-a and the base station 105-a. In such cases, the initial transmit power may be determined as a function of a target range (e.g., target sensing range of object 235) and an estimated path loss between the UE 115-a and the base station 105-a.

The UE 115-a may transmit, to the base station 105-a, a first sensing signal 225-a of the RF sensing procedure for the detection of one or more objects (e.g., object 235). The UE 115-a may be configured to transmit the first sensing signal 225-a at the first transmit power (e.g., initial transmit power) which was indicated via the control signaling 215 and/or determined by the UE 115-a (e.g., based on a channel estimate).

For example, the UE 115-a may transmit the first sensing signal 225-a based on (e.g., in accordance with) one or more parameters for the RF sensing procedure indicated via the control signaling 215, including a bandwidth for sensing signals 225 of the RF sensing procedure, a set of sensing occasions for transmitting sensing signals 225 of the RF sensing procedure, a set of pulse repetition intervals for the RF sensing procedure, a time interval for performing the RF sensing procedure, a maximum transmit power for sensing signals 225 of the RF sensing procedure, a target range of the object 235, a location of the object 235, or any combination thereof. For example, in cases where the control signaling 215 indicates a set of sensing occasions (e.g., set of sensing sessions) for the RF sensing procedure, the UE 115-a may transmit the first sensing signal 225-a within a first sensing occasion of the set of sensing occasions. In this example, the first sensing signal 225-a of the RF sensing procedure may be scheduled by the base station 105-a.

As illustrated in FIG. 2, in some cases, the UE 115-a may transmit a first instance of the first sensing signal 225-a along a first path (e.g., via communication link 205) to the base station 105-a, and a second instance of the first sensing signal 225-a along a second path, where the second instance of the first sensing signal 225-a transmitted along the second path may be reflected or refracted off the object 235 to the base station 105-a. In other words, the base station 105-a may receive a first instance of the first sensing signal 225 from the UE 115-a via communication link 205, and may receive a second instance of the first sensing signal 225-a which is reflected/refracted off the object 235. In this regard, base station 105-a may be configured to determine time delays, phase shifts, and other parameters associated with first and second instances of the first sensing signal 225-a in order to identify a position and/or location of the object 235.

In some aspects, the UE 115-a may receive, from the base station 105-a, a power control message 230-a (e.g., transmission power control (TPC) command) for sensing signals 225 of the RF sensing procedure. For example, the power control message 230-a may indicate a power control strategy for transmitting sensing signals 225 of the RF sensing procedure. In some aspects, the UE 115-a may receive the power control message 230-a based on (e.g., in response to) the first sensing signal 225-a. The power control message 230-a may include an RRC message, a MAC-CE message, a DCI message, or any combination thereof.

In some implementations, upon transmitting/receiving the first sensing signal 225-a, the UE 115-a and the base station 105-a may be able to implement closed-loop power control techniques for the RF sensing procedure. Closed-loop power control techniques may be used to improve the range, transmit power, and detection performance of the RF sensing procedure in a closed-loop manner (e.g., based on feedback from the base station 105-a). In particular, the base station 105-a may be configured to trigger an adjustment of a transmit power of sensing signals 225 transmitted by the UE 115-a in a closed-loop manner based on a strength of the first sensing signal 225-a received at the base station 105-a, an absence or presence of objects (e.g., object 235) detected based on the first sensing signal 225-a, or both.

For example, in some cases, the base station 105-a may detect a weak target (e.g., weak first sensing signal 225-a) and may instruct the UE 115-a to increase (e.g., boost) a transmit power of sensing signals 225 via the power control message 230-a. In such cases, the base station 105-a may indicate for the UE 115-a to increase the transmit power in order to reduce or eliminate Type I (e.g., false-positive) and Type II (e.g., false-negative) object detection errors. As such, the base station 105-a may instruct the UE 115-a to increase (e.g., boost) a transmit power of sensing signals 225 in order to reduce a detection uncertainty and increase an efficiency/accuracy of the RF sensing procedure.

In some cases, the power control message 230-a may explicitly indicate a transmit power which is to be used by the UE 115-a for subsequent sensing signals 225. For example, the power control message 230-a may indicate a second transmit power which is to be used by the UE 115-a to transmit a second sensing signal 225-b of the RF sensing procedure. In additional or alternative cases, the power control message 230-a may indicate a power ramping procedure (e.g., power ramping scheme) which is to be performed by the UE 115-a during the RF sensing procedure. The UE 115-a may be configured to selectively adjust (e.g., ramp up, ramp down) a transmit power for each sensing occasion (e.g., each sensing signal 225) in accordance with the indicated power ramping procedure.

In some cases, the power ramping procedure which is to be performed by the UE 115-a may be dynamically indicated via the power control message 230-a. Additionally, or alternatively, the UE 115-a may be configured (e.g., preconfigured, or configured via RRC signaling) with a set of power ramping procedures, where the power control message 230-a indicates which power ramping procedure is to be performed. For example, the control signaling 215 may configure the UE 115-a with a set of power ramping procedures. In this example, the power control message 230-a may indicate (e.g., via one or more bit field values) which power ramping procedure from the set of power ramping procedures is to be employed/performed by the UE 115-a. For instance, bit field values "00," "01" and "11" may indicate a fixed power ramping procedure, a linear power ramping procedure, and a geometric power ramping procedure, respectively.

In some cases, the power control strategy indicated by the power control message 230-a may be implemented per-target, per-beam 210, or both. For example, the power control message 230-a may instruct the UE 115-a to direct/focus subsequent sensing signals 225 toward a determined/estimated position of the object 235. In other cases, the power control message 230-a may indicate one or more beams 210 to which the power control message 230-a applies. For example, in the cases where the RF sensing procedure is performed via beam 210 sweeping at the UE 115-a (e.g., the UE 115-a transmits sensing signals 225 by sweeping across a set of beams 210), the power control message 230-a may specify which beams 210 of the set of beams 210 at the UE 115-c that the power control message 230-c applies. In this regard, the power control message 230-a may instruct the UE 115-a to adjust (e.g., increase) a transmit power for specific beams 210, perform a power ramping procedure for specific beams 210, or both.

Moreover, in the cases of multi-static RF sensing cases (e.g., RF procedures in which multiple Rx devices receive the sensing signals 225), the power control message 230-a may be configured, or derived, in such a manner as to maximize the overall detection performance of the RF sensing procedure using all the Rx devices (e.g., Rx instances), or to enhance a detection performance of specific Rx devices. Additionally, in the case of multi-Tx sensing (e.g., multiple Tx devices transmitting sensing signals 225), the base station 105-a may transmit power control messages 230 to each Tx device (each Tx node) separately in order to implement closed-loop power control at each of the respective Tx devices. In additional or alternative cases, multiple Tx nodes may be grouped in a sensing Tx group (e.g., based on location of the Tx nodes), such that the base station 105-a may transmit a common power control message 230 to each Tx node in the sensing Tx group.

Implementing power control techniques may exhibit increased complexity in the context of RF sensing procedures as compared to some other power control procedures between UEs 115 and base stations 105. For example, the transmission of multiple instances of sensing signals 225 (e.g., via communication link 205, and via a path reflected off object 235) may add a layer of complexity which is not present in other contexts. In particular, due to the increased path length of signals reflected off object 235, a given transmit power may be sufficient for instances of sensing signals 225 transmitted via communication link 205, where that same transmit power may be insufficient for instances of sensing signals 225 which are to be reflected/refracted off the object 235. Thus, separate power control procedures may be performed for the separate instances of the sensing signals 225 transmitted via the different paths.

In cases where the UE 115-a is configured to perform a power ramping procedure, the UE 115-a may perform the power ramping procedure to adjust a transmit power of the RF sensing procedure. In particular, the UE 115-a may be configured to perform the power ramping procedure which was indicated via the control signaling 215, via the power control message 230-a, or both. The UE 115-a may perform the power ramping procedure to adjust (e.g., increase, decrease) a transmit power of the RF sensing procedure from the first transmit power to a second transmit power.

For example, in cases where the UE 115-a is instructed to employ/perform a fixed ramping procedure, the UE 115-a may adjust (e.g., increase) the transmit power of the RF sensing procedure by a fixed unit (e.g., $P_{TX}(r)=(r+1)P_{TX}(0)$). By way of another example, in cases where the UE 115-a is instructed to perform a linear ramping procedure, the UE 115-a may adjust (e.g., increase) the transmit power of the RF sensing procedure by a linear step (e.g., $P_{TX}(0)$, $2P_{TX}(0)$, $3P_{TX}(0)$:

$$P_{TX}(r) = \frac{r^2 + r + 1}{2} P_{TX}(0)).$$

Moreover, in cases where the UE 115-*a* is instructed to perform a geometric ramping procedure, the UE 115-*a* may adjust (e.g., increase) the transmit power of the RF sensing procedure according to a geometric ramping scheme (e.g., $P_{TX}(r)=2^r P_{TX}(0)$).

In additional or alternative implementations, the UE 115-*a* may be configured to autonomously adjust (e.g., increase) the transmit power of sensing signals 225 without explicit signaling from the base station 105-*a*. For example, in some cases, the UE 115-*a* may be configured to adjust the transmit power of the sensing signals 225 based on one or more triggers. In such cases, the UE 115-*a* may determine a satisfaction of one or more criteria, which may trigger the UE 115-*a* to adjust the transmit power. For instance, the UE 115-*a* may adjust the transmit power of the sensing signal 225 if it does not receive a message from the base station 105-*a* within some threshold period of time following the sensing signal 225. In such cases, the absence of a message from the base station 105-*a* may serve as a trigger for adjusting the transmit power.

The UE 115-*a* may transmit, to the base station 105-*a*, a second sensing signal 225-*b* of the RF sensing procedure for the detection of one or more objects (e.g., object 235). The UE 115-*a* may be configured to transmit the second sensing signal 225-*b* at a second transmit power which may be explicitly indicated via the power control message 230-*b*, determined based on the power ramping procedure, or both. In this regard, the UE 115-*b* may transmit the second sensing signal 225-*b* based on receiving the control signaling 215, receiving the power control message 230 (e.g., TPC command), performing the power ramping procedure, or any combination thereof.

For example, the UE 115-*a* may transmit the second sensing signal 225-*b* using a second transmit power which is higher than the first transmit power used to transmit the first sensing signal 225-*a*. The UE 115-*a* may increase the transmit power for the second sensing signal 225-*a* in response to the power control message 230-*a* in order to reduce a detection uncertainty and increase an efficiency/accuracy of the RF sensing procedure. By way of another example, in cases where the control signaling 215 indicates a set of sensing occasions for the RF sensing procedure, the UE 115-*a* may transmit the second sensing signal 225-*b* within a second sensing occasion of the set of sensing occasions. In some cases, increasing the transmit power of the second sensing signal 225-*a* may increase a sensing range of the second sensing signal 225-*b* relative to the first sensing signal 225-*a*, which may increase a receive power at the base station 105-*a* and enable objects which were out of range of the first sensing signal 225-*a* to be detected by the second sensing signal 225-*b*.

In some cases, the base station 105-*a* may a position/location and/or distance of the object 235 based on receiving the second sensing signal 225-*b*. In particular, the base station 105-*a* may identify the object 235 based on receiving a first instance of the second sensing signal 225-*b* from the UE 115-*a* (e.g., via communication link 205), and may receive a second instance of the second sensing signal 225-*b* which is reflected/refracted off the object 235. In this regard, base station 105-*a* may be configured to determine time delays, phase shifts, and other parameters associated with first and second instances of the second sensing signal 225-*b* in order to identify a position and/or location of the object 235.

In some cases, the base station 105-*a* may identify the object 235 based on the second sensing signal 225-*b* with a sufficient detection certainty or reliability (e.g., detection certainty metric which satisfies a threshold). Comparatively, in some cases, the base station 105-*a* may identify the object 235 based on the first sensing signal 225-*a* with a detection certainty metric which fails to satisfy the respective threshold. Upon identifying the object 235 with a sufficient detection certainty, the base station 105-*a* may instruct the UE 115-*a* that it may reduce its transmit power for the RF sensing procedure vis subsequent power control messages 230.

For instance, the UE 115-*a* may receive, from the base station 105-*a*, an additional power control message 230-*b* (e.g., TPC command) for sensing signals 225 of the RF sensing procedure. In some aspects, the UE 115-*a* may receive the additional power control message 230-*b* based on (e.g., in response to) the second sensing signal 225-*b*. The power control message 230 may include an RRC message, a MAC-CE message, a DCI message, or any combination thereof.

As noted previously herein with respect to the first power control message 230-*a*, the additional power control message 230-*b* may trigger an adjustment of a transmit power of sensing signals 225 transmitted by the UE 115-*a* in a closed-loop manner based on a strength of the second sensing signal 225-*b* received at the base station 105-*a*, an absence or presence of objects (e.g., object 235) detected based on the second sensing signal 225-*b*, or both. In this regard, the additional power control message 230-*b* may explicitly indicate a transmit power which is to be used by subsequent sensing signals 225. Additionally, or alternatively, the additional power control message 230-*b* may instruct the UE 115-*a* to continue performing the power ramping procedure, to perform a different power ramping procedure, to stop performing the power ramping procedure, or any combination thereof.

In some aspects, the UE 115-*a* may stop performing the power ramping procedure. In other words, the UE 115-*a* may be configured to stop adjusting a transmit power of the RF sensing procedure in accordance with the power ramping procedure. The UE 115-*a* may stop performing the power ramping procedure based on receiving the control signaling 215, receiving the power control message 230-*a*, transmitting the second sensing signal 225-*b*, receiving the additional power control message 230-*b*, or any combination thereof.

In some aspects, the UE 115-*a* may be configured to perform/apply the power ramping procedure or other power control strategy for a specified time interval, for a specified number of sensing occasions, or until the UE 115-*a* is instructed to stop. In other words, the UE 115-*a* may be configured to perform the power ramping procedure (e.g., power control scheme, power control strategy) until the base station 105-*a* is able to detect targets (e.g., object 235) with a sufficient level of accuracy or confidence. Once the base station 105-*a* detects the object 235 with a sufficient level of accuracy/confidence, the UE 115-*a* may be configured (e.g., pre-configured, or based on signaling from the base station 105-*a*) to transmit sensing signals 225 with a default power level, or in accordance with a transmit power determined according to open-loop power control techniques.

For example, in some cases, the additional power control message 230-*b* may include an explicit indication for the UE 115-*a* to stop performing the power ramping procedure. By way of another example, in some cases, the control signaling 215, the first power control message 230-*a*, and/or the additional power control message 230-*b* may indicate a time interval for performing the power ramping procedure. In this example, the UE 115-*a* may be configured to perform the power ramping procedure for at least a portion of the time interval (e.g., a duration of the time interval), and may stop performing the power ramping procedure upon an expiration of the time interval. Similarly, in other cases, the control signaling 215, the first power control message 230-a, and/or the additional power control message 230-b may indicate a quantity of sensing occasions (e.g., quantity of sensing signals 225) for performing the power ramping procedure. In this example, the UE 115-a may be configured to stop performing the power ramping procedure after performing the power ramping procedure for the indicated quantity of sensing occasions.

In some implementations, the UE 115-a may transmit, to the base station 105-a, a third sensing signal 225-c of the RF sensing procedure for the detection of one or more objects (e.g., object 235). The UE 115-b may transmit the third sensing signal 225-c based on receiving the control signaling 215, receiving the power control messages 230-a, 230-b, stopping the power ramping procedure, or any combination thereof.

In this regard, once the base station 105-a detects the object 235 with a sufficient level of accuracy/confidence, the UE 115-a may be configured (e.g., pre-configured, or based on signaling from the base station 105-a) to transmit sensing signals 225 with a default power level, or in accordance with a transmit power determined according to open-loop power control techniques. For example, the UE 115-a may transmit the third sensing signal 225-c using a default transmit power which may be configured via the control signaling 215, the power control message 230-a, the additional power control message 230-b, or any combination thereof. In some cases, the first/initial transmit power used to transmit the first sensing signal 225-a may include the default transmit power with which the third sensing signal 225-c is transmitted.

While aspects of the present disclosure are generally described in the context of RF sensing procedures in which the UE 115-a is the Tx device and the base station 105-a is the Rx device (e.g., UE-based sensing), this is not to be regarded as a limitation of the present disclosure. In particular, aspects of the present disclosure may also be directed to RF sensing procedures in which the base station 105-a is the Tx device and the UE 115-a is the Rx device (e.g., gNB-based sensing). For example, in such cases, the base station 105-a may transmit sensing signals 225 which are reflected/refracted off object 235 and received by the UE 115-a. In this example, the UE 115-a may transmit feedback messages indicating parameters of the sensing signals 225, including a presence, position, or location of the object 235, a signal strength of the received sensing signals 225, and the like. In gNB-based sensing procedures, the base station 105-a may be configured to adjust a transmit power of the sensing signals 225 (e.g., ramp up, ramp down) based on the report/outcome of the previous sensing signal 225 or sensing occasion (e.g., based on feedback from the UE 115-a).

Techniques described herein may enable power control techniques for RF sensing procedure. In particular, techniques described herein may enable the UE 115-a to determine an initial transmit power for RF sensing procedures via open-loop power control techniques, and may enable the base station 105-a to selectively adjust transmit powers of RF sensing procedures via closed-loop power control techniques. By enabling RF sensing procedure power control techniques, aspects of the present disclosure may enable efficient and reliable determination of objects via the RF sensing procedures. Additionally, aspects of the present disclosure may reduce interference within the wireless communications system 200 which is attributable to sensing signals 225 of RF sensing procedures, thereby reducing noise and improving resource utilization within the wireless communications system 200.

Figure 3:
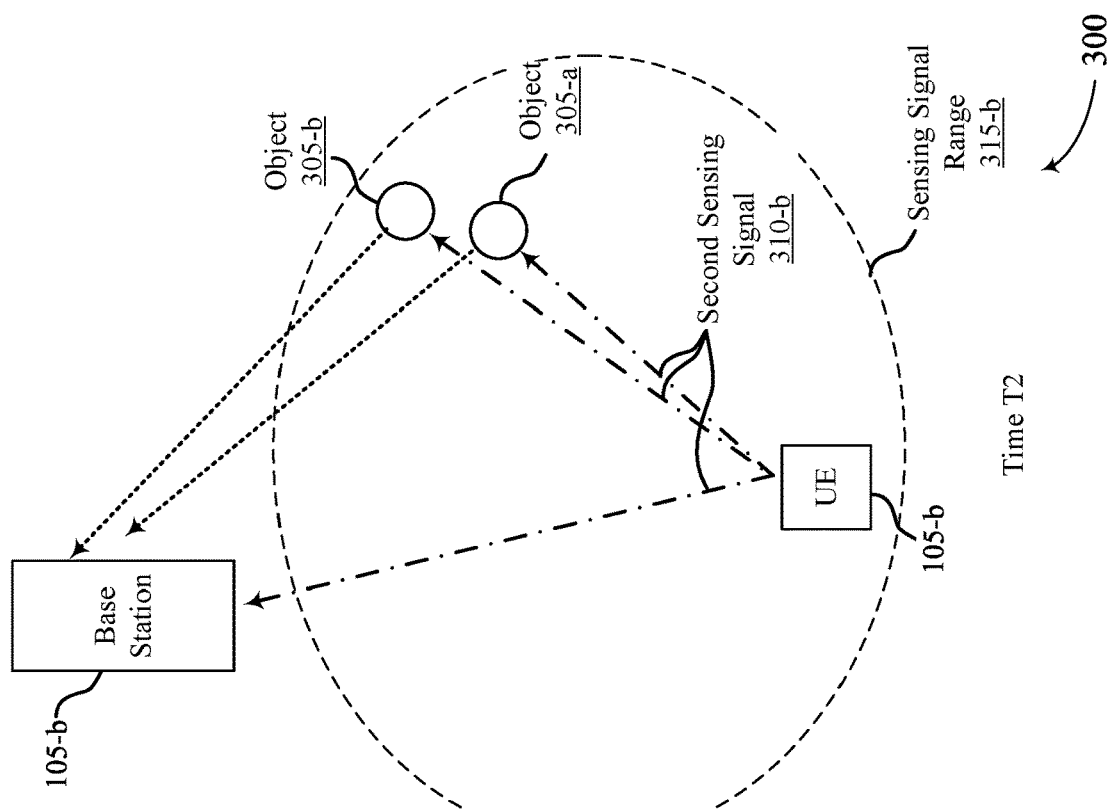
FIG. 3 illustrates an example of a wireless communications system that supports power control techniques for cooperative sensing in accordance with one or more aspects of the present disclosure.
Figure 3:
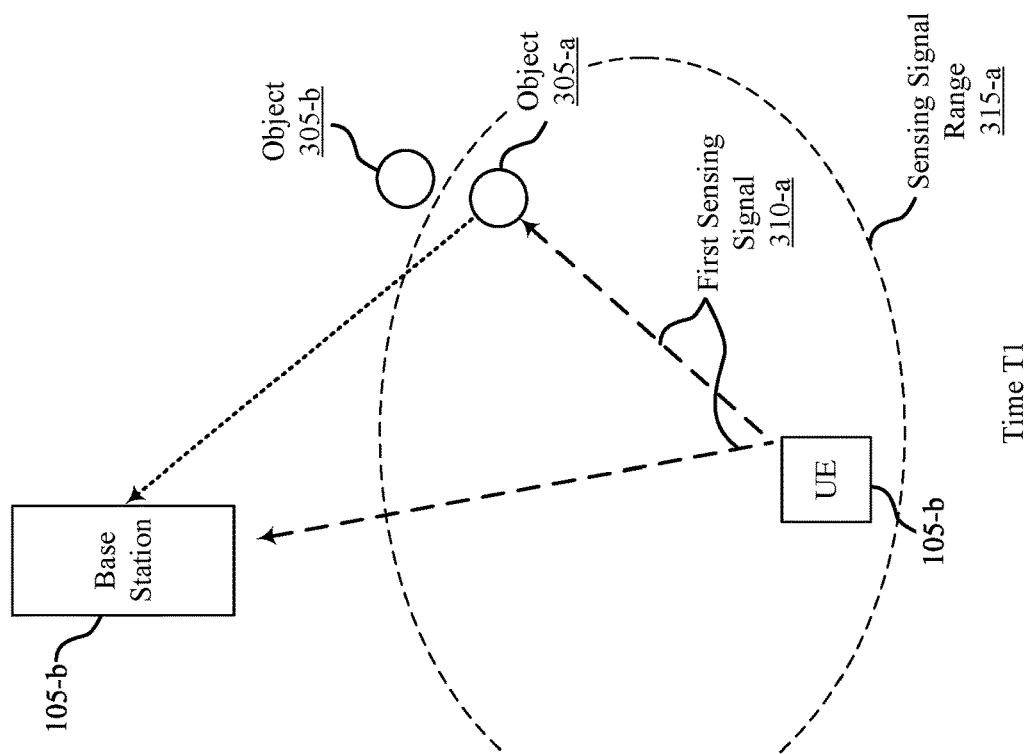

FIG. 3 illustrates an example of a wireless communications system 300 that supports power control techniques for cooperative sensing in accordance with one or more aspects of the present disclosure. In some examples, wireless communications system 300 may implement, or be implemented by, aspects of wireless communications system 100, wireless communications system 200, or both. The wireless communications system 300 may include a UE 115 b and a base station 105 b, which may be examples of UEs 115 and base stations 105, as described with reference to FIGS. 1-2.

The wireless communications system 300 shown in FIG. 3 includes a base station 105-b and a UE 115-a, which may be examples of the base station 105-a and the UE 115-a, respectively, as illustrated in in FIG. 2. In particular, FIG. 3 illustrates the wireless communications system 300 at a first time (e.g., Time T1) and a second time (e.g., Time T2), where the second time is subsequent to the first time.

The UE 115-b and the base station 105-b may be configured to perform an RF sensing procedure for the detection of one or more objects 305-a, 305-b. For example, as shown at T1, the UE 115-b may be configured to transmit a first sensing signal 310-a to the base station 105-b. In some aspects, the UE 115-b may transmit a first instance and a second instance of the first sensing signal 310-a, where the first instance of the first sensing signal 310-a may be transmitted to the base station 105-b (e.g., directly to the base station 105-b), and the second instance of the sensing signal may be reflected or refracted off an object 305-a to the base station 105-b. In this regard, the base station 105-b may be configured to determine time delays, phase shifts, and other parameters between the first and second instances of the first sensing signal 310-a to identify a position, location, distance, or any combination, of the object 305-a.

The UE 115-a may transmit the first sensing signal 310-a at T1 with a first, or initial, transmit power. As noted previously herein, the first/initial transmit power may be determined according to open-loop power control techniques. For example, in some cases, the first/initial transmit power may be pre-configured at the UE 115-b, signaled to the UE 115-b by the base station 105-b via control signaling, or both. Additionally, or alternatively, the UE 115-b may determine the first/initial transmit power based on a channel estimate of a channel between the UE 115-b and the base station 105-b, a target range for the one or more objects 305, or both.

As noted previously herein, a sensing range of the sensing signals 310 of an RF sensing procedure may be a function of a transmit power of the respective sensing signals 310. For example, as shown at T1, the first sensing signals 310-a may exhibit a sensing signal range 315-a, where the sensing signal range 315-a is a function of the first/initial transmit power of the first sensing signal 310-a. As shown at T1, the first object 305-a may be towards an outer limit of the sensing signal range 315-a, where the second object 305-b is outside of the sensing signal range 315-a. As such, the first sensing signal 310-a may reach, or otherwise be used to identify/detect the first object 305-a, but may be unable to reach or otherwise used to identify/detect the second object 305-b.

In some cases, the base station 105-b may receive a relatively weak first sensing signal 310-a at T1. In particular, the relatively low first/initial transmit power with which the first sensing signal 310-a was transmitted may result in a relatively weak first sensing signal 310-a received at the base station 105-*b*. As such, at T1, or following T1, the base station 105-*b* may instruct the UE 115-*b* (e.g., via a power control message) to increase a transmit power of subsequent sensing signals 310. The base station 105-*b* may instruct the UE 115-*b* to increase the transmit power in order to increase a received power of sensing signals at the base station 105-*b*, and therefore improve a detection certainty, and reduce or eliminate Type I (e.g., false-positive) and Type II (e.g., false-negative) object detection errors. Additionally, or alternatively, the base station 105-*b* may instruct the UE 115-*b* to increase the transmit power in order to enable detection of objects 305 (e.g., object 305-*b*) which are outside of the first sensing signal range 315-*a* of the first sensing signal 310-*a*.

As noted previously herein, the base station 105-*b* may instruct the UE 115-*b* to adjust (e.g., increase) a transmit power of sensing signals 310 via explicit indications of transmit powers, by indicating power ramping procedures which are to be performed by the UE 115-*b*, or both. For example, at a time between T1 and T2, the base station 105-*b* may transmit a power control message to the UE 115-*b* which indicates a second transmit power associated with a second sensing signal 310-*b* of the RF sensing procedure, where the second transmit power is greater than the first/initial transmit power. In this regard, at T2, the UE 115-*b* may transmit a second sensing signal 310-*b* of the RF sensing procedure.

In additional or alternative implementations, the UE 115-*b* may be configured to autonomously adjust (e.g., increase) the transmit power of sensing signals 310 without explicit signaling from the base station 105-*b*. For example, in some cases, the UE 115-*b* may be configured to adjust the transmit power of the sensing signals 310 based on one or more triggers. In such cases, the UE 115-*b* may determine a satisfaction of one or more criteria, which may trigger the UE 115-*b* to adjust the transmit power. For instance, the UE 115-*b* may adjust the transmit power of the sensing signal 310 if it does not receive a message from the base station 105-*b* within some threshold period of time following the sensing signal 310. In such cases, the absence of a message from the base station 105-*b* may serve as a trigger for adjusting the transmit power.

As discussed with reference to the first sensing signal 310-*a*, the UE 115-*b* may transmit multiple instances of the second sensing signal 310-*b*. Additionally, due to the fact that the second transmit power is greater than the first/initial transmit power, the second sensing signal 310-*b* may exhibit a second sensing signal range 315-*b* which is greater than (e.g., wider than, covers more area) the first sensing signal range 315-*b*. In this regard, the second sensing signal 310-*b* may be used for the detection of both the first object 305-*a* and the second object 305-*b*, as illustrated in FIG. 3. Moreover, the greater transmit power of the second sensing signal 310-*b* relative to the first sensing signal 310-*b* may increase a receive power of the second sensing signal 310-*b* at the base station 105-*b*, which may thereby improve a detection certainty (e.g., efficiency, accuracy, reliability) of the RF sensing procedure.

Figure 4:
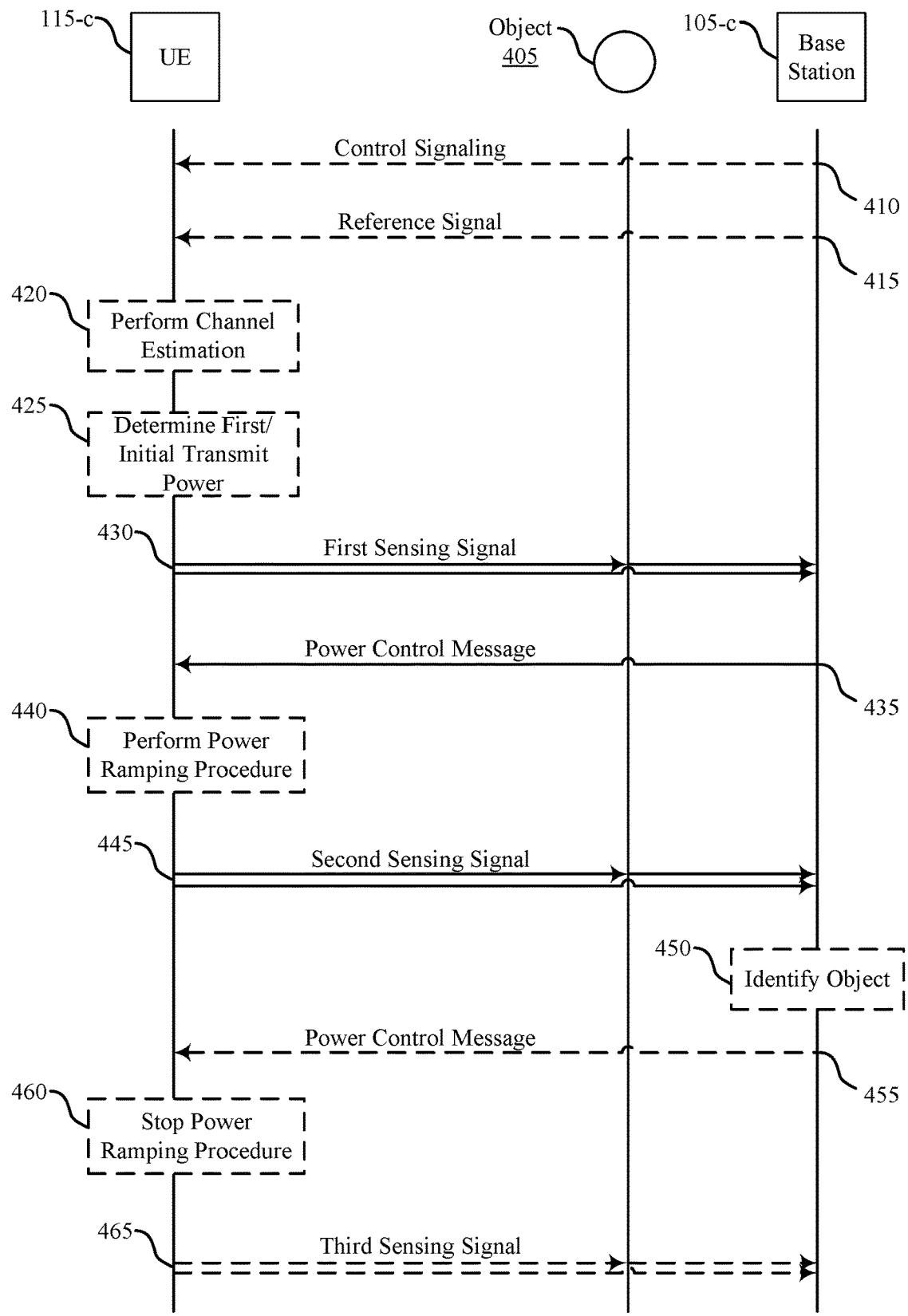
FIG. 4 illustrates an example of a process flow that supports power control techniques for cooperative sensing in accordance with one or more aspects of the present disclosure.

FIG. 4 illustrates an example of a process flow 400 that supports power control techniques for cooperative sensing in accordance with one or more aspects of the present disclosure. In some examples, process flow 400 may implement, or be implemented by, aspects of wireless communications system 100, wireless communications system 200, wireless communications system 300, or any combination thereof. For example, the process flow 400 may illustrate a UE 115-*c* transmitting a first sensing signal of an RF sensing procedure at a first transmit power, receiving a power control message, and transmitting a second sensing signal of the RF sensing procedure at a second transmit power, as described with reference to FIGS. 1-3.

In some cases, process flow 400 may include a UE 115-*c* and a base station 105-*c*, which may be examples of corresponding devices as described herein. For example, the UE 115-*c* illustrated in FIG. 4 may be an example of the UE 115-*a* and/or UE 115-*b* illustrated in FIG. 2 and FIG. 3, respectively. Similarly, the base station 105-*c* illustrated in FIG. 4 may be an example of the base station 105-*a* and/or base station 105-*b* illustrated in FIG. 2 and FIG. 3, respectively. However, it may be understood that the UE 115-*c* and the base station 105-*c* illustrated in FIG. 4 may include any wireless devices known in the art, including IAB nodes 104, CPEs, and the like. In some The UE 115-*c* and the base station 105-*c* illustrated in FIG. 4 may be configured to perform RF sensing procedures for the detection of one or more objects, including an object 405.

In some examples, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 410, the UE 115-*c* may receive control signaling from the base station 105-*c*. The control signaling may include an RRC message, a DCI message, an SSB message, a MAC-CE, or any combination thereof. In some cases, the control signaling may be associated with cooperative sensing procedures (e.g., bistatic RF sensing procedure, multi-static RF sensing procedure) which may be performed between the UE 115-*c* and the base station 105-*c*. In this regard, the control signaling may include information associated with performing RF sensing procedures at the UE 115-*c*, including a set of power ramping procedures which may be implemented at the UE 115-*c*, an initial transmit power for sensing signals transmitted by the UE 115-*c* during a sensing procedure, a path loss model for RF sensing procedures at the UE 115-*c*, and other parameters for performing RF sensing procedures at the UE 115-*c*.

For example, in some cases, the control signaling may indicate a set of power ramping procedures which may be used by the UE 115-*c* to modify (e.g., selectively adjust) a transmit power associated with sensing signals of an RF sensing procedure. The set of power ramping procedures may include fixed power ramping procedures, linear power ramping procedures, geometric power ramping procedures, or any combination thereof. By way of another example, the control signaling may indicate a path loss model which may be used by the UE 115-*c* to perform channel estimation and determine an initial transmit power for sensing signals of an RF sensing procedure. Additionally, or alternatively, the control signaling may explicitly indicate an initial transmit power which is to be used by the UE 115-*c* to transmit a first sensing signal of an RF sensing procedure.

By way of another example, the control signaling may indicate one or more parameters associated with an RF sensing procedure to be performed at the UE 115-*c*. Parameters associated with the RF sensing procedure may include a bandwidth for sensing signals of the RF sensing procedure, a set of sensing occasions for transmitting sensing signals of the RF sensing procedure, a set of pulse repetition intervals for the RF sensing procedure, a time interval for performing the RF sensing procedure, a maximum transmit power for sensing signals of the RF sensing procedure, a target range of objects (e.g., object 405), a location of the objects, or any combination thereof.

At 415, the UE 115-c may receive a reference signal from the base station 105-c. The reference signal may include, but is not limited to, a CSI-RS. In some cases, the UE 115-c may receive the reference signal at 415 based on receiving the control signaling associated with RF sensing procedures at 410. For example, in some cases, the UE 115-c may receive the reference signal for performing a channel estimation of a channel between the UE 115-c and the base station 105-c, where the channel estimation may be used to determine an initial transmit power for sensing signals of an RF sensing procedure during open-loop power control for the RF sensing procedure.

At 420, the UE 115-c may perform a channel estimation procedure based on the reference signal received from the base station 105-c at 415. In this regard, the UE 115-c may perform a channel estimate of a channel between the UE 115-c and the base station 105-c by performing measurements (e.g., RSSI, RSRP, RSRQ, SNR, SINR, CQI) on the reference signal received at 415.

In some cases, the UE 115-c may perform the channel estimation procedure based on (e.g., in accordance with) a path loss model configured at the UE 115-c or signaled to the UE 115-c via the base station 105-c. For example, as noted previously herein, the UE 115-c may receive an indication of a path loss model for RF sensing procedures via the control signaling at 410. In this example, the UE 11-c may perform the channel estimation procedure at 420 based on the reference signal at 415 and in accordance with the indicated path loss model. In particular, the UE 115-c may estimate path loss between the UE 115-c and the base station based on measurements (e.g., RSSI) performed on the reference signal and channel reciprocity for communications from the base station 105-c to the UE 115-c and vice versa.

At 425, the UE 115-c may determine a first transmit power (e.g., initial transmit power) for sensing signals of the RF sensing procedure. The UE 115-c may determine the first transmit power for the RF sensing procedure based on receiving the control signaling at 410, receiving the reference signal at 415, performing the channel estimation at 420, or any combination thereof.

In some implementations, the UE 115-c may determine the first/initial transmit power for the RF sensing procedure based on open-loop power control techniques for RF sensing. In cases of open-loop power control, the Tx device (e.g., UE 115-c) may not yet have feedback from the Rx device (e.g., base station 105-c) to adjust the transmit power of the sensing signals. As such, using open-loop power control techniques, the UE 115-c may determine/choose an initial transmit power based on signal measurements (e.g., measurements on the reference signal), a target coverage range (e.g., target range of object 405), a power budget, or any combination thereof.

For example, in some cases, the control signaling at 410 may indicate a transmit power (e.g., initial transmit power, maximum transmit power) and other parameters (e.g., bandwidth, sensing occasions, pulse repetition intervals) as part of a configuration for RF sensing procedures at the UE 115-c. In this example, the UE 115-c may determine the first/initial transmit power based on the indication of the initial transmit power and/or maximum transmit power indicated via the control signaling. By way of another example, the UE 115-c may determine the initial transmit power for the RF sensing procedure based on the channel estimation performed at 420. In such cases, the initial transmit power may be determined as a function of a target range (e.g., target sensing range of object 405) and an estimated path loss between the UE 115-c and the base station 105-c.

At 430, the UE 115-c may transmit, to the base station 105-c, a first sensing signal of the RF sensing procedure for the detection of one or more objects (e.g., object 405). The UE 115-c may be configured to transmit the first sensing signal at the first transmit power (e.g., initial transmit power) determined at 420. Additionally, or alternatively, the UE 115-c may transmit the first sensing signal at 430 based on receiving the control signaling at 410, receiving the reference signal at 415, performing the channel estimation at 420, or any combination thereof.

For example, the UE 115-c may transmit the first sensing signal based on (e.g., in accordance with) one or more parameters for the RF sensing procedure indicated via the control signaling, including a bandwidth for sensing signals of the RF sensing procedure, a set of sensing occasions for transmitting sensing signals of the RF sensing procedure, a set of pulse repetition intervals for the RF sensing procedure, a time interval for performing the RF sensing procedure, a maximum transmit power for sensing signals of the RF sensing procedure, a target range of the object 405, a location of the object 405, or any combination thereof. For example, in cases where the control signaling indicates a set of sensing occasions (e.g., set of sensing sessions) for the RF sensing procedure, the UE 115-c may transmit the first sensing signal within a first sensing occasion of the set of sensing occasions. In this example, the first sensing signal of the RF sensing procedure may be scheduled by the base station 105-c.

As noted previously herein and illustrated in FIG. 4, in some cases, the UE 115-c may transmit a first instance of the first sensing signal along a first path to the base station 105-c (e.g., path directly to the base station 105-c), and a second instance of the first sensing signal along a second path, where the second instance of the first sensing signal transmitted along the second path may be reflected or refracted off the object 405 to the base station 105-c. In other words, the base station 105-c may receive a first instance of the first sensing signal from the UE 115-c, and may receive a second instance of the first sensing signal which is reflected/refracted off the object 405. In this regard, base station 105-c may be configured to determine time delays, phase shifts, and other parameters associated with first and second instances of the first sensing signal in order to identify a position and/or location of the object 405.

At 435, the UE 115-c may receive, from the base station 105-c, a power control message (e.g., TPC command) for sensing signals of the RF sensing procedure. For example, the power control message may indicate a power control strategy for transmitting sensing signals of the RF sensing procedure. In some aspects, the UE 115-c may receive the power control message based on (e.g., in response to) the first sensing signal. The power control message may include an RRC message, a MAC-CE message, a DCI message, or any combination thereof.

In some implementations, upon transmitting/receiving the first sensing signal at 440, the UE 115-c and the base station 105-c may be able to implement closed-loop power control techniques for the RF sensing procedure. Closed-loop power control techniques may be used to improve the range, transmit power, and detection performance of the RF sensing procedure in a closed-loop manner (e.g., based on feedback from the base station 105-c). In particular, the base station 105-*c* may be configured to trigger an adjustment of a transmit power of sensing signals transmitted by the UE 115-*c* in a closed-loop manner based on a strength of the first sensing signal received at the base station 105-*c*, an absence or presence of objects (e.g., object 405) detected based on the first sensing signal, or both.

For example, in some cases, the base station 105-*c* may detect a weak target (e.g., weak first sensing signal) and may instruct the UE 115-*c* to increase (e.g., boost) a transmit power of sensing signals via the power control message. In such cases, the base station 105-*c* may indicate for the UE 115-*c* to increase the transmit power in order to reduce or eliminate Type I (e.g., false-positive) and Type II (e.g., false-negative) object detection errors. As such, the base station 105-*c* may instruct the UE 115-*c* to increase (e.g., boost) a transmit power of sensing signals in order to reduce a detection uncertainty and increase an efficiency/accuracy of the RF sensing procedure.

In some cases, the power control message may explicitly indicate a transmit power which is to be used by the UE 115-*c*. For example, the power control message may indicate a second transmit power which is to be used by the UE 115-*c* to transmit a second sensing signal of the RF sensing procedure. In additional or alternative cases, the power control message may indicate a power ramping procedure (e.g., power ramping scheme) which is to be performed by the UE 115-*c* during the RF sensing procedure. The UE 115-*c* may be configured to selectively adjust (e.g., ramp up, ramp down) a transmit power for each sensing occasion (e.g., each sensing signal) in accordance with the indicated power ramping procedure.

In some cases, the power ramping procedure which is to be performed by the UE 115-*c* may be dynamically indicated via the power control message at 435. Additionally, or alternatively, the UE 115-*c* may be configured (e.g., pre-configured, or configured via RRC signaling) with a set of power ramping procedures, where the power control message indicates which power ramping procedure is to be performed. For example, the control signaling at 410 may configure the UE 115-*c* with a set of power ramping procedures. The set of power ramping procedures may include a fixed power ramping procedure, a linear power ramping procedure, a geometric power ramping procedure, or any combination thereof. In this example, the power control message may indicate (e.g., via one or more bit field values) which power ramping procedure from the set of power ramping procedures is to be employed/performed by the UE 115-*c*.

In some cases, the power control strategy indicated by the power control message may be implemented per-target, per-beam, or both. For example, the power control message may instruct the UE 115-*c* to direct/focus subsequent sensing signals toward a determined/estimated position of the object 405. In other cases, the power control message may indicate one or more beams to which the power control message applies. For example, in the cases where the RF sensing procedure is performed via beam sweeping at the UE 115-*c*, the power control message may specify to which beams the power control command applies. In this regard, the power control command may instruct the UE 115-*c* to adjust (e.g., increase) a transmit power for specific beams, perform a power ramping procedure for specific beams, or both.

In cases where the power control message explicitly indicates a transmit power which is to be used by the UE 115-*c*, the process flow 400 may proceed to 445. Comparatively, in cases where the power control message indicates a power ramping procedure which is to be employed by the UE 115-*c*, the process flow 400 may proceed to 440.

At 440, the UE 115-*c* may perform the power ramping procedure to adjust a transmit power of the RF sensing procedure. In particular, the UE 115-*c* may be configured to perform the power ramping procedure which was indicated via the control signaling at 410, via the power control message at 435, or both. As noted previously herein, in some implementations, the UE 115-*b* may be configured to adjust the transmit power of sensing signals (e.g., perform the power ramping procedure) based on one or more triggers. In such cases, the UE 115-*c* may perform the power ramping procedure without explicit signaling from the base station 105-*c*. The UE 115-*c* may perform the power ramping procedure to adjust (e.g., increase, decrease) a transmit power of the RF sensing procedure from the first transmit power to a second transmit power.

For example, in cases where the UE 115-*c* is instructed to employ/perform a fixed ramping procedure, the UE 115-*c* may adjust (e.g., increase) the transmit power of the RF sensing procedure by a fixed unit (e.g., $P_{TX}(r)=(r+1)P_{TX}(0)$). By way of another example, in cases where the UE 115-*c* is instructed to perform a linear ramping procedure, the UE 115-*c* may adjust (e.g., increase) the transmit power of the RF sensing procedure by a linear step (e.g., $P_{TX}(0)$, $2P_{TX}(0)$, $3P_{TX}(0)$):

$$P_{TX}(r) = \frac{r^2+r+1}{2} P_{TX}(0)).$$

Moreover, in cases where the UE 115-*c* is instructed to perform a geometric ramping procedure, the UE 115-*c* may adjust (e.g., increase) the transmit power of the RF sensing procedure according to a geometric ramping scheme (e.g., $P_{TX}(r)=2^r P_{TX}(0)$).

At 445, the UE 115-*c* may transmit, to the base station 105-*c*, a second sensing signal of the RF sensing procedure for the detection of one or more objects (e.g., object 405). The UE 115-*c* may be configured to transmit the second sensing signal at a second transmit power which may be explicitly indicated via the power control message at 435, determined based on the power ramping procedure at 440, or both. In this regard, the UE 115-*b* may transmit the second sensing signal at 445 based on receiving the control signaling at 410, performing the channel estimation at 420, determining the initial transmit power at 425, transmitting the first sensing signal at 430, receiving the power control message (e.g., TPC command) at 435, performing the power ramping procedure at 440, or any combination thereof.

For example, the UE 115-*c* may transmit the second sensing signal using a second transmit power which is higher than the first transmit power used to transmit the first sensing signal at 430. The UE 115-*c* may increase the transmit power for the second sensing signal in response to the power control message in order to reduce a detection uncertainty and increase an efficiency/accuracy of the RF sensing procedure. By way of another example, in cases where the control signaling at 410 indicates a set of sensing occasions for the RF sensing procedure, the UE 115-*c* may transmit the second sensing signal within a second sensing occasion of the set of sensing occasions. In some cases, increasing the transmit power of the second sensing signal may increase a sensing range of the second sensing signal relative to the first sensing signal, which may increase a receive power at the base station 105-*c* and enable objects which were out of range of the first sensing signal to be detected by the second sensing signal.

At 450, the base station 105-*c* may identify the object 405. The UE 115-*b* may identify a position/location and/or distance of the object 405 at 450 based on receiving the second sensing signal at 445. In particular, the base station 105-*c* may identify the object 405 based on receiving a first instance of the second sensing signal from the UE 115-*c*, and may receive a second instance of the second sensing signal which is reflected/refracted off the object 405. In this regard, base station 105-*c* may be configured to determine time delays, phase shifts, and other parameters associated with first and second instances of the second sensing signal in order to identify a position and/or location of the object 405.

In some cases, the base station 105-*c* may identify the object 405 at 450 based on the second sensing signal with a sufficient detection certainty or reliability (e.g., detection certainty metric which satisfies a threshold). Comparatively, in some cases, the base station 105-*c* may identify the object 405 based on the first sensing signal with a detection certainty metric which fails to satisfy the respective threshold. Upon identifying the object 405 at 450 with a sufficient detection certainty, the base station 105-*c* may instruct the UE 115-*c* that it may reduce its transmit power for the RF sensing procedure, as described at 455.

At 455, the UE 115-*c* may receive, from the base station 105-*c*, an additional power control message (e.g., TPC command) for sensing signals of the RF sensing procedure. In some aspects, the UE 115-*c* may receive the additional power control message at 450 based on (e.g., in response to) the second sensing signal. The power control message may include an RRC message, a MAC-CE message, a DCI message, or any combination thereof.

As noted previously herein with respect to the first power control message at 435, the additional power control message may trigger an adjustment of a transmit power of sensing signals transmitted by the UE 115-*c* in a closed-loop manner based on a strength of the second sensing signal received at the base station 105-*c*, an absence or presence of objects (e.g., object 405) detected based on the second sensing signal, or both. In this regard, the additional power control message may explicitly indicate a transmit power which is to be used by subsequent sensing signals. Additionally, or alternatively, the additional power control message may instruct the UE 115-*c* to continue performing the power ramping procedure, to perform a different power ramping procedure, to stop performing the power ramping procedure, or any combination thereof.

At 460, the UE 115-*c* may stop performing the power ramping procedure. In other words, the UE 115-*c* may be configured to stop adjusting a transmit power of the RF sensing procedure in accordance with the power ramping procedure. The UE 115-*c* may stop performing the power ramping procedure based on receiving the control signaling at 410, performing the channel estimation at 420, determining the initial transmit power at 435, transmitting the first sensing signal at 430, receiving the power control message at 435, performing the power control procedure at 440, transmitting the second sensing signal at 445, receiving the power control message at 455, or any combination thereof.

In some aspects, the UE 115-*c* may be configured to perform/apply the power ramping procedure or other power control strategy for a specified time interval, for a specified number of sensing occasions, or until the UE 115-*c* is instructed to stop. In other words, the UE 115-*c* may be configured to perform the power ramping procedure (e.g., power control scheme, power control strategy) until the base station 105-*c* is able to detect targets (e.g., object 405) with a sufficient level of accuracy or confidence. Once the base station 105-*c* detects the object 405 with a sufficient level of accuracy/confidence, the UE 115-*c* may be configured (e.g., pre-configured, or based on signaling from the base station 105-*c*) to transmit sensing signals with a default power level, or in accordance with a transmit power determined according to open-loop power control techniques.

For example, in some cases, the additional power control message at 450 may include an explicit indication for the UE 115-*c* to stop performing the power ramping procedure. By way of another example, in some cases, the control signaling at 410, the first power control message at 435, and/or the additional power control message at 455 may indicate a time interval for performing the power ramping procedure. In this example, the UE 115-*c* may be configured to perform the power ramping procedure for a duration of the time interval, and may stop performing the power ramping procedure upon an expiration of the time interval. Similarly, in other cases, the control signaling at 410, the first power control message at 435, and/or the additional power control message at 455 may indicate a quantity of sensing occasions (e.g., quantity of sensing signals) for performing the power ramping procedure. In this example, the UE 115-*c* may be configured to stop performing the power ramping procedure after performing the power ramping procedure for the indicated quantity of sensing occasions.

At 465, the UE 115-*c* may transmit, to the base station 105-*c*, a third sensing signal of the RF sensing procedure for the detection of one or more objects (e.g., object 405). The UE 115-*b* may transmit the third sensing signal at 460 based on receiving the control signaling at 410, performing the channel estimation at 420, determining the initial transmit power at 425, transmitting the first sensing signal at 430, receiving the power control message (e.g., TPC command) at 435, performing the power ramping procedure at 440, transmitting the second sensing signal at 445, receiving the additional power control message at 455, stopping the power ramping procedure at 460, or any combination thereof.

In this regard, once the base station 105-*c* detects the object 405 with a sufficient level of accuracy/confidence, the UE 115-*c* may be configured (e.g., pre-configured, or based on signaling from the base station 105-*c*) to transmit sensing signals with a default power level, or in accordance with a transmit power determined according to open-loop power control techniques. For example, the UE 115-*c* may transmit the third sensing signal using a default transmit power which may be configured via the control signaling at 410, the power control message at 435, the additional power control message at 455, or any combination thereof. In some cases, the first/initial transmit power determined at 425 may include the default transmit power.

Techniques described herein may enable power control techniques for RF sensing procedure. In particular, techniques described herein may enable the UE 115-*c* to determine an initial transmit power for RF sensing procedures via open-loop power control techniques, and may enable the base station 105-*c* to selectively adjust transmit powers of RF sensing procedures via closed-loop power control techniques. By enabling RF sensing procedure power control techniques, aspects of the present disclosure may enable efficient and reliable determination of objects via the RF sensing procedures. Additionally, aspects of the present disclosure may reduce interference within the wireless communications system which is attributable to sensing signals of RF sensing procedures, thereby reducing noise and improving resource utilization within the wireless communications system.

Figure 5:
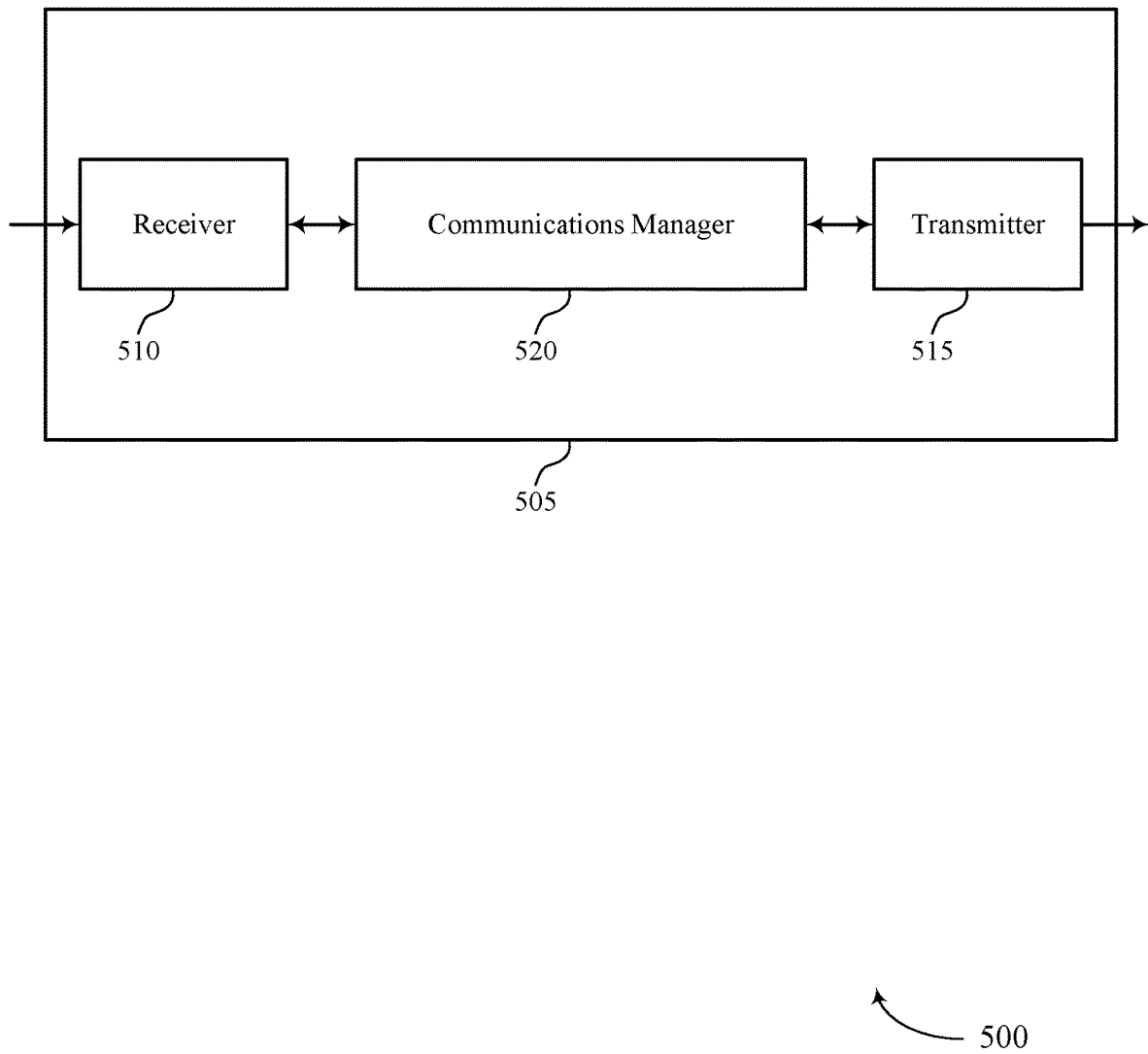
FIGS. 5 and 6 show block diagrams of devices that support power control techniques for cooperative sensing in accordance with one or more aspects of the present disclosure.

FIG. 5 shows a block diagram 500 of a device 505 that supports power control techniques for cooperative sensing in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to power control techniques for cooperative sensing). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to power control techniques for cooperative sensing). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of power control techniques for cooperative sensing as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for transmitting, at a first transmit power, a first sensing signal of a RF sensing procedure. The communications manager 520 may be configured as or otherwise support a means for receiving, from a base station at least in part in response to the first sensing signal, a power control message for sensing signals of the RF sensing procedure. The communications manager 520 may be configured as or otherwise support a means for transmitting, at a second transmit power based on the received power control message, a second sensing signal of the RF sensing procedure.

By including or configuring the communications manager 520 in accordance with examples as described herein, the device 505 (e.g., a processor controlling or otherwise coupled to the receiver 510, the transmitter 515, the communications manager 520, or a combination thereof) may support power control techniques for RF sensing procedure. In particular, techniques described herein may enable the UE 115 to determine an initial transmit power for RF sensing procedures via open-loop power control techniques, and may enable the base station 105 to selectively adjust transmit powers of RF sensing procedures via closed-loop power control techniques. By enabling RF sensing procedure power control techniques, aspects of the present disclosure may enable efficient and reliable determination of objects via the RF sensing procedures. Additionally, aspects of the present disclosure may reduce interference within the wireless communications system which is attributable to sensing signals of RF sensing procedures, thereby reducing noise and improving resource utilization within the wireless communications system.

Figure 6:
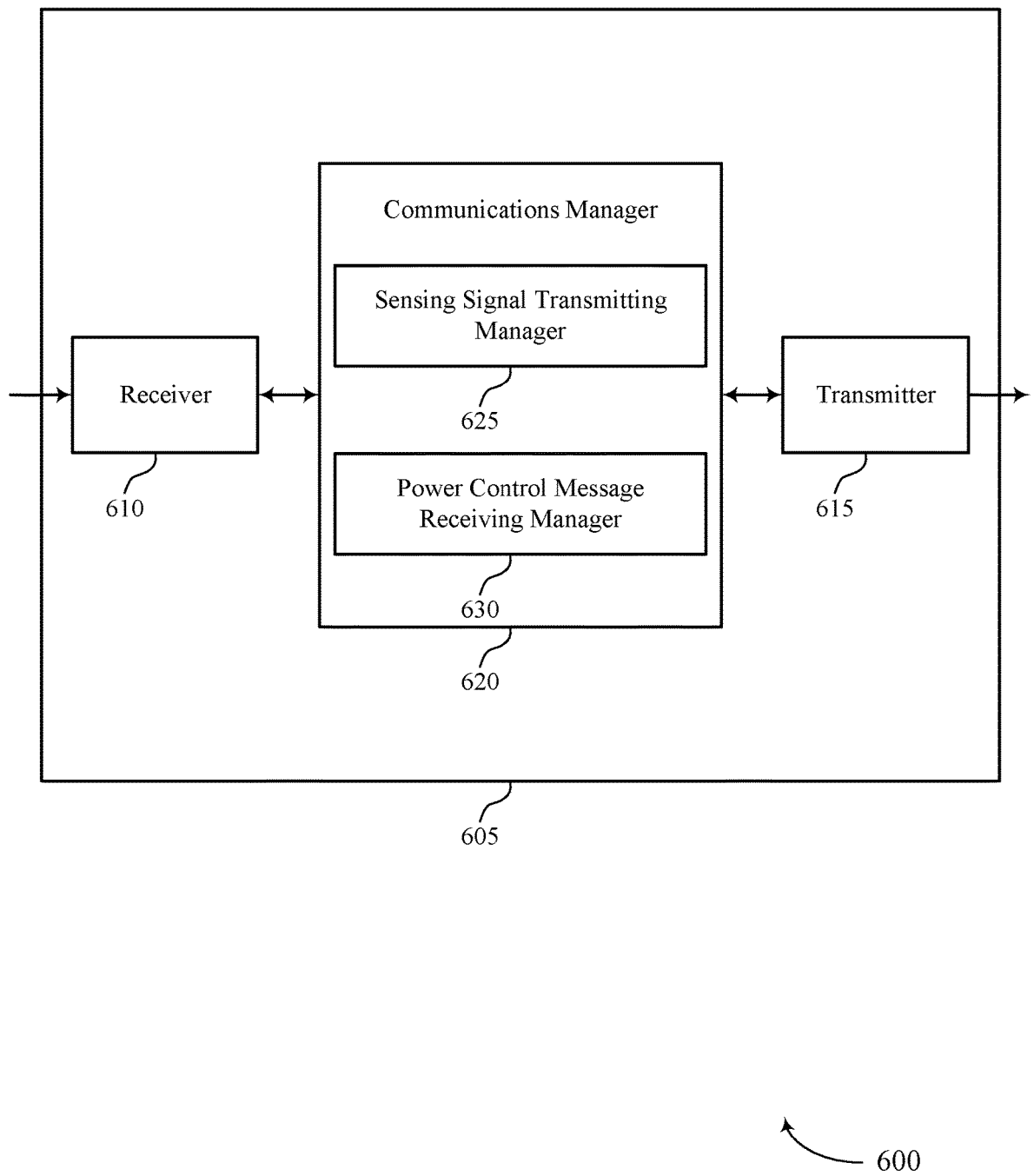

FIG. 6 shows a block diagram 600 of a device 605 that supports power control techniques for cooperative sensing in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to power control techniques for cooperative sensing). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to power control techniques for cooperative sensing). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of power control techniques for cooperative sensing as described herein. For example, the communications manager 620 may include a sensing signal transmitting manager 625 a power control message receiving manager 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The sensing signal transmitting manager 625 may be configured as or otherwise support a means for transmitting, at a first transmit power, a first sensing signal of a RF sensing procedure. The power control message receiving manager 630 may be configured as or otherwise support a means for receiving, from a base station at least in part in response to the first sensing signal, a power control message for sensing signals of the RF sensing procedure. The sensing signal transmitting manager 625 may be configured as or otherwise support a means for transmitting, at a second transmit power based on the received power control message, a second sensing signal of the RF sensing procedure.

Figure 7:
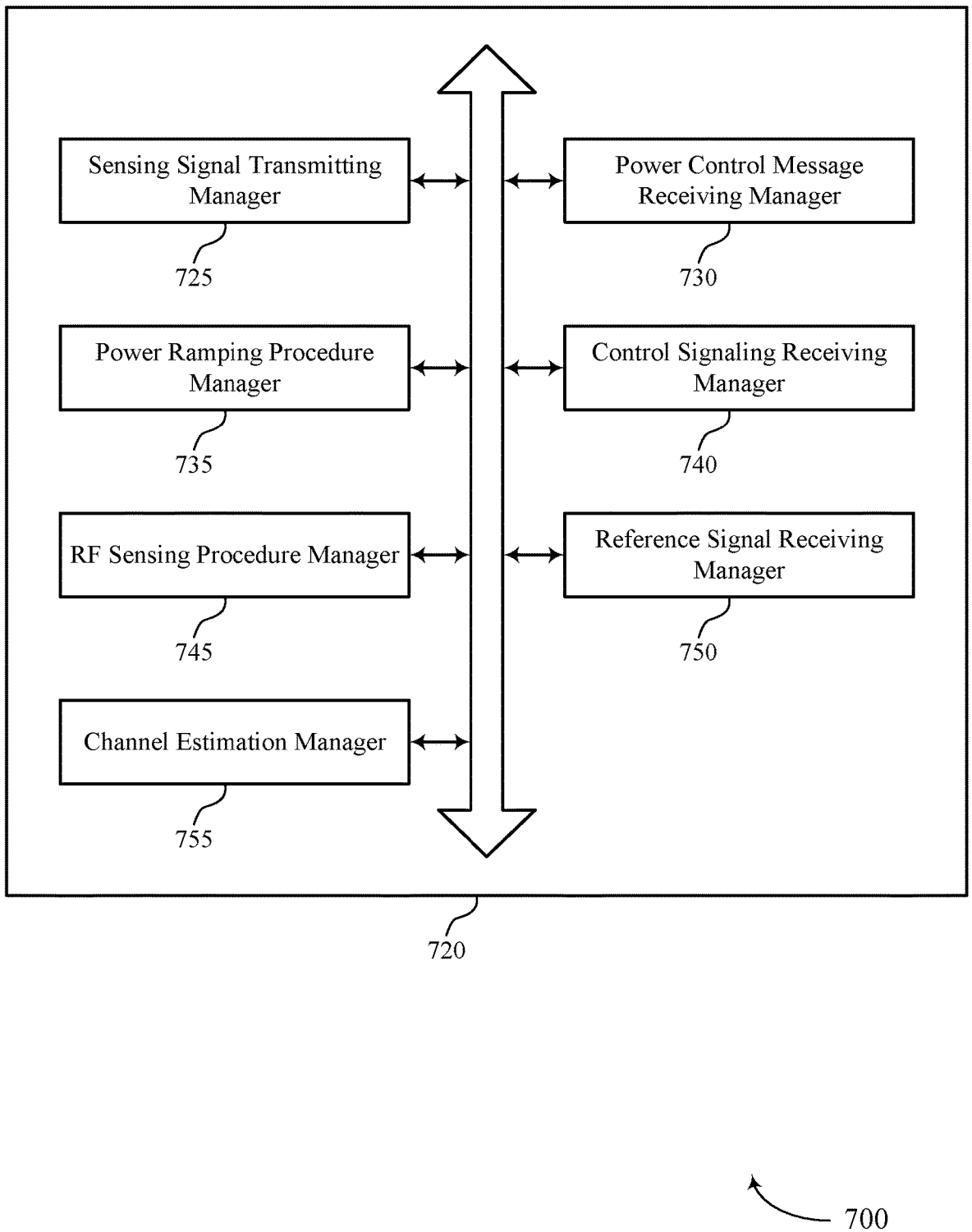
FIG. 7 shows a block diagram of a communications manager that supports power control techniques for cooperative sensing in accordance with one or more aspects of the present disclosure.

FIG. 7 shows a block diagram 700 of a communications manager 720 that supports power control techniques for cooperative sensing in accordance with one or more aspects of the present disclosure. The communications manager 720 may be an example of aspects of a communications manager 520, a communications manager 620, or both, as described herein. The communications manager 720, or various components thereof, may be an example of means for performing various aspects of power control techniques for cooperative sensing as described herein. For example, the communications manager 720 may include a sensing signal transmitting manager 725, a power control message receiving manager 730, a power ramping procedure manager 735, a control signaling receiving manager 740, an RF sensing procedure manager 745, a reference signal receiving manager 750, a channel estimation manager 755, or any combination thereof. Each of these components may communicate, directly or indirectly, with one another (e.g., via one or more buses).

The communications manager 720 may support wireless communication at a UE in accordance with examples as disclosed herein. The sensing signal transmitting manager 725 may be configured as or otherwise support a means for transmitting, at a first transmit power, a first sensing signal of a RF sensing procedure. The power control message receiving manager 730 may be configured as or otherwise support a means for receiving, from a base station at least in part in response to the first sensing signal, a power control message for sensing signals of the RF sensing procedure. In some examples, the sensing signal transmitting manager 725 may be configured as or otherwise support a means for transmitting, at a second transmit power based on the received power control message, a second sensing signal of the RF sensing procedure.

In some examples, the power control message receiving manager 730 may be configured as or otherwise support a means for receiving, via the power control message, an indication of the second transmit power, where transmitting the second sensing signal is based on the indication of the second transmit power.

In some examples, the power control message receiving manager 730 may be configured as or otherwise support a means for receiving, via the power control message, an indication that the UE is to adjust a transmit power for the RF sensing procedure. In some examples, the power ramping procedure manager 735 may be configured as or otherwise support a means for adjusting a transmit power of the RF sensing procedure from the first transmit power to the second transmit power, where transmitting the second sensing signal is based on adjusting the transmit power. In some examples, the power ramping procedure manager 735 may be configured to adjust the transmit power by performing a power ramping procedure.

In some examples, the control signaling receiving manager 740 may be configured as or otherwise support a means for receiving, from the base station, control signaling indicating a set of power ramping procedures including the power ramping procedure, where the power ramping procedure is included within the set of power ramping procedures.

In some examples, the power ramping procedure includes a fixed power ramping procedure, a linear power ramping procedure, a geometric power ramping procedure, or any combination thereof.

In some examples, the power control message receiving manager 730 may be configured as or otherwise support a means for receiving, from the base station, a second power control message indicating that the UE is to stop performing the power ramping procedure. In some examples, the sensing signal transmitting manager 725 may be configured as or otherwise support a means for transmitting, at a default transmit power based on the received second power control message, a third sensing signal of the RF sensing procedure.

In some examples, the power control message receiving manager 730 may be configured as or otherwise support a means for receiving, via the power control message, an indication of a time interval for the power ramping procedure. In some examples, the power ramping procedure manager 735 may be configured as or otherwise support a means for performing the power ramping procedure to adjust the transmit power of the RF sensing procedure for at least a portion of the time interval.

In some examples, the control signaling receiving manager 740 may be configured as or otherwise support a means for receiving, from the base station, control signaling indicating an initial transmit power, the first transmit power including the initial transmit power.

In some examples, the control signaling receiving manager 740 may be configured as or otherwise support a means for receiving, from the base station, control signaling indicating a path loss model for RF sensing procedures at the UE, where transmitting the first sensing signal at the first transmit power is based on the indicated path loss model.

In some examples, the reference signal receiving manager 750 may be configured as or otherwise support a means for receiving a reference signal from the base station. In some examples, the channel estimation manager 755 may be configured as or otherwise support a means for performing a channel estimation procedure based on the received reference signal and in accordance with the indicated path loss model. In some examples, the RF sensing procedure manager 745 may be configured as or otherwise support a means for determining the first transmit power based on performing the channel estimation procedure.

In some examples, the RF sensing procedure manager 745 may be configured as or otherwise support a means for determining the first transmit power based on a target range of one or more objects detected via the RF sensing procedure.

In some examples, the power control message receiving manager 730 may be configured as or otherwise support a means for receiving, via the power control message, an indication of one or more beams of the UE, where transmitting the second sensing signal includes transmitting the second sensing signal using at least a subset of the one or more beams based on the indication of the one or more beams.

In some examples, the control signaling receiving manager 740 may be configured as or otherwise support a means for receiving, from the base station, control signaling indicating one or more parameters for the RF sensing procedure, where transmitting the first sensing signal, transmitting the second sensing signal, or both, is based on the one or more parameters.

In some examples, the one or more parameters include a bandwidth for the sensing signals of the RF sensing procedure, a set of one or more sensing occasions for the sensing signals of the RF sensing procedure, a set of one or more pulse repetition intervals for the RF sensing procedure, a time interval for the RF sensing procedure, a maximum transmission power for the sensing signals of the RF sensing procedure, a target range for one or more objects detected via the RF sensing procedure, a location of the one or more objects, or any combination thereof.

Figure 8:
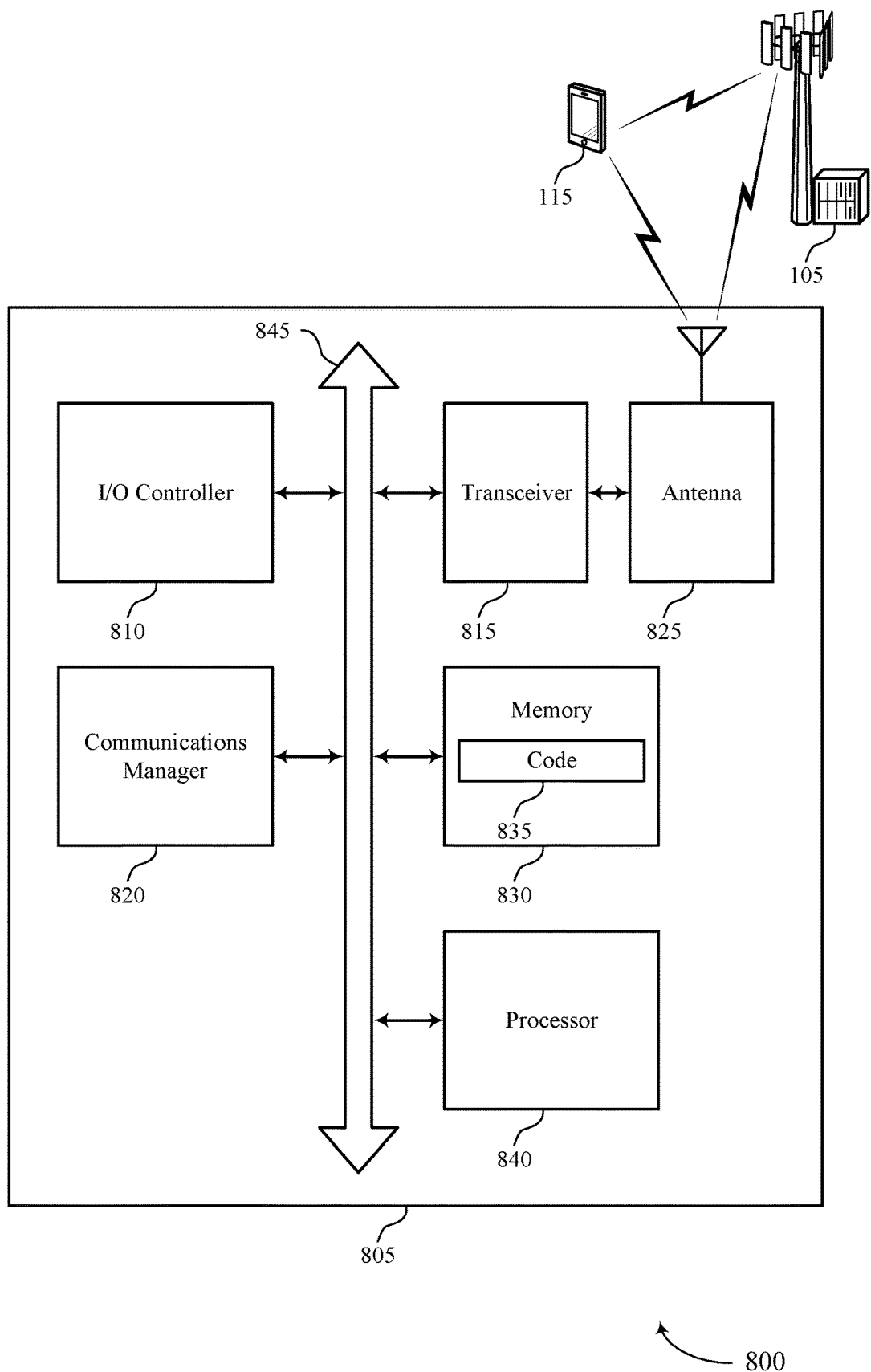
FIG. 8 shows a diagram of a system including a device that supports power control techniques for cooperative sensing in accordance with one or more aspects of the present disclosure.

FIG. 8 shows a diagram of a system 800 including a device 805 that supports power control techniques for cooperative sensing in accordance with one or more aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting power control techniques for cooperative sensing). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for transmitting, at a first transmit power, a first sensing signal of a RF sensing procedure. The communications manager 820 may be configured as or otherwise support a means for receiving, from a base station at least in part in response to the first sensing signal, a power control message for sensing signals of the RF sensing procedure. The communications manager 820 may be configured as or otherwise support a means for transmitting, at a second transmit power based on the received power control message, a second sensing signal of the RF sensing procedure.

By including or configuring the communications manager 820 in accordance with examples as described herein, the device 805 may support techniques for power control techniques for RF sensing procedure. In particular, techniques described herein may enable the UE 115 to determine an initial transmit power for RF sensing procedures via open-loop power control techniques, and may enable the base station 105 to selectively adjust transmit powers of RF sensing procedures via closed-loop power control techniques. By enabling RF sensing procedure power control techniques, aspects of the present disclosure may enable efficient and reliable determination of objects via the RF sensing procedures. Additionally, aspects of the present disclosure may reduce interference within the wireless communications system which is attributable to sensing signals of RF sensing procedures, thereby reducing noise and improving resource utilization within the wireless communications system.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of power control techniques for cooperative sensing as described herein, or the processor 840 and the memory 830 may be otherwise configured to perform or support such operations.

Figure 9:
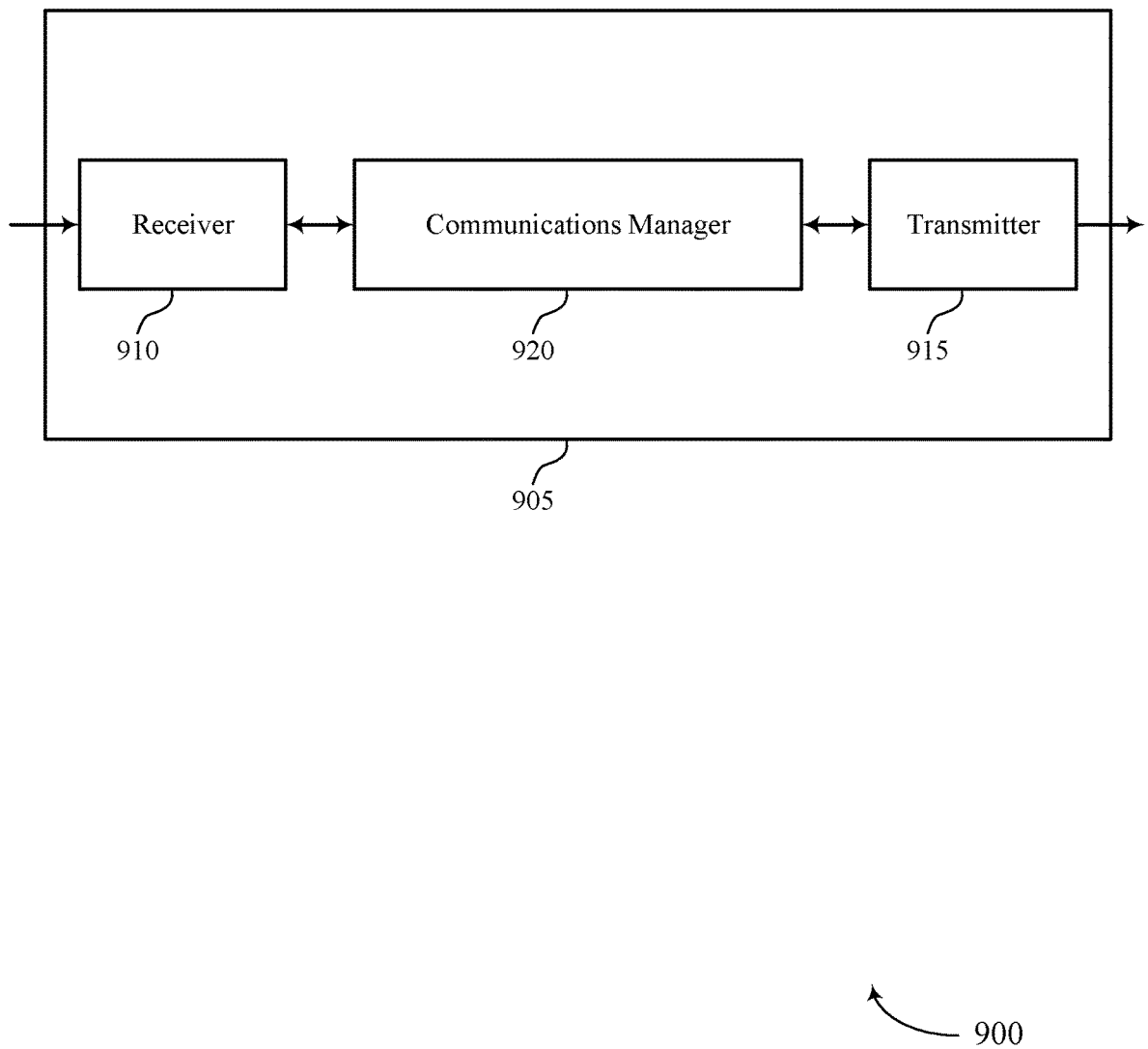
FIGS. 9 and 10 show block diagrams of devices that support power control techniques for cooperative sensing in accordance with one or more aspects of the present disclosure.

FIG. 9 shows a block diagram 900 of a device 905 that supports power control techniques for cooperative sensing in accordance with one or more aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to power control techniques for cooperative sensing). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to power control techniques for cooperative sensing). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of power control techniques for cooperative sensing as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for receiving a first sensing signal of a RF sensing procedure. The communications manager 920 may be configured as or otherwise support a means for transmitting, to a UE at least in part in response to the first sensing signal, a power control message for sensing signals to be transmitted by the UE in the RF sensing procedure. The communications manager 920 may be configured as or otherwise support a means for receiving, at least in part in response to the transmitted power control message, a second sensing signal of the RF sensing procedure. The communications manager 920 may be configured as or otherwise support a means for identifying one or more objects based on receiving the second sensing signal.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for power control techniques for RF sensing procedure. In particular, techniques described herein may enable the UE 115 to determine an initial transmit power for RF sensing procedures via open-loop power control techniques, and may enable the base station 105 to selectively adjust transmit powers of RF sensing procedures via closed-loop power control techniques. By enabling RF sensing procedure power control techniques, aspects of the present disclosure may enable efficient and reliable determination of objects via the RF sensing procedures. Additionally, aspects of the present disclosure may reduce interference within the wireless communications system which is attributable to sensing signals of RF sensing procedures, thereby reducing noise and improving resource utilization within the wireless communications system.

Figure 10:
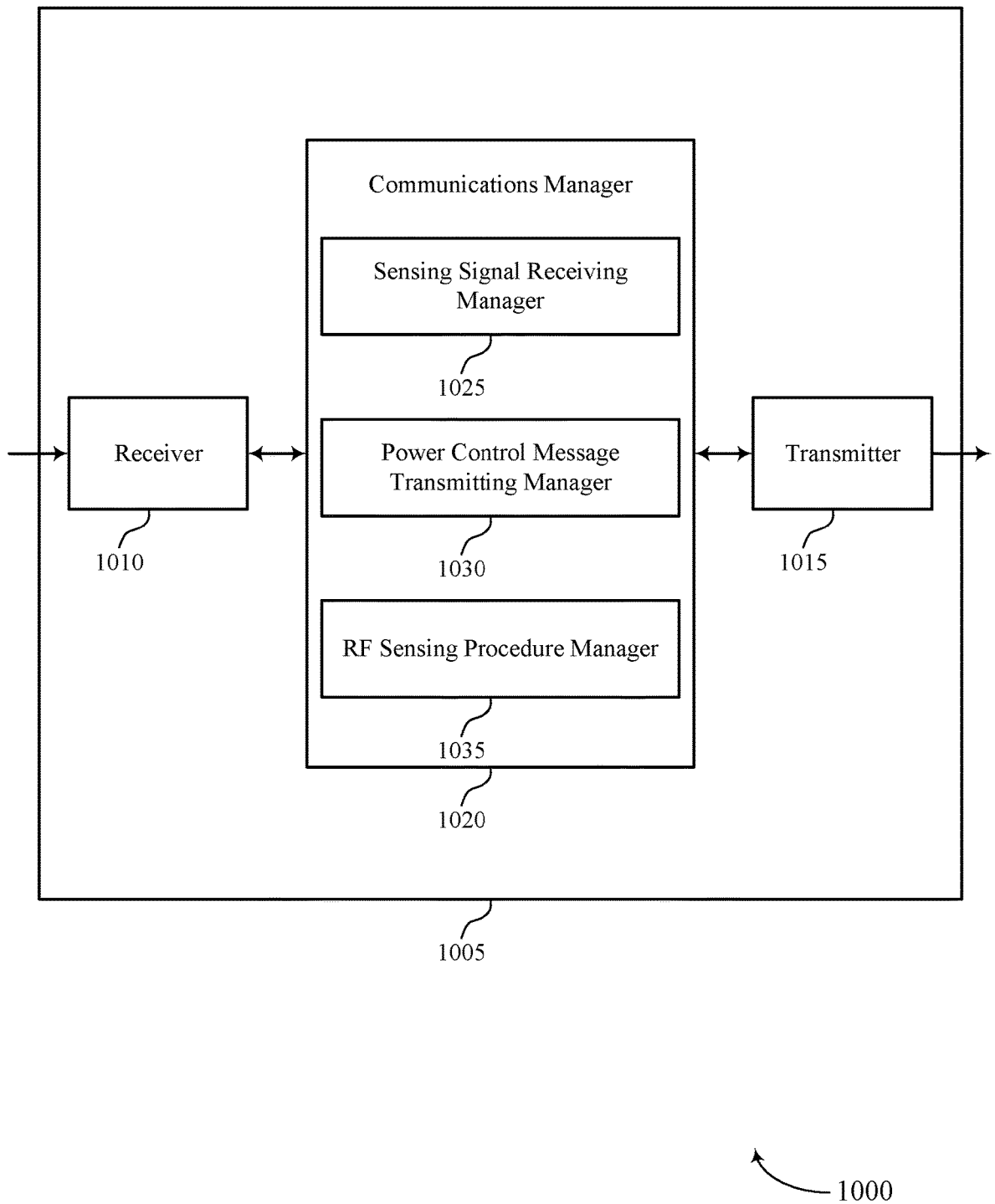

FIG. 10 shows a block diagram 1000 of a device 1005 that supports power control techniques for cooperative sensing in accordance with one or more aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to power control techniques for cooperative sensing). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to power control techniques for cooperative sensing). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of power control techniques for cooperative sensing as described herein. For example, the communications manager 1020 may include a sensing signal receiving manager 1025, a power control message transmitting manager 1030, an RF sensing procedure manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The sensing signal receiving manager 1025 may be configured as or otherwise support a means for receiving a first sensing signal of a RF sensing procedure. The power control message transmitting manager 1030 may be configured as or otherwise support a means for transmitting, to a UE at least in part in response to the first sensing signal, a power control message for sensing signals to be transmitted by the UE in the RF sensing procedure. The sensing signal receiving manager 1025 may be configured as or otherwise support a means for receiving, at least in part in response to the transmitted power control message, a second sensing signal of the RF sensing procedure. The RF sensing procedure manager 1035 may be configured as or otherwise support a means for identifying one or more objects based on receiving the second sensing signal.

Figure 11:
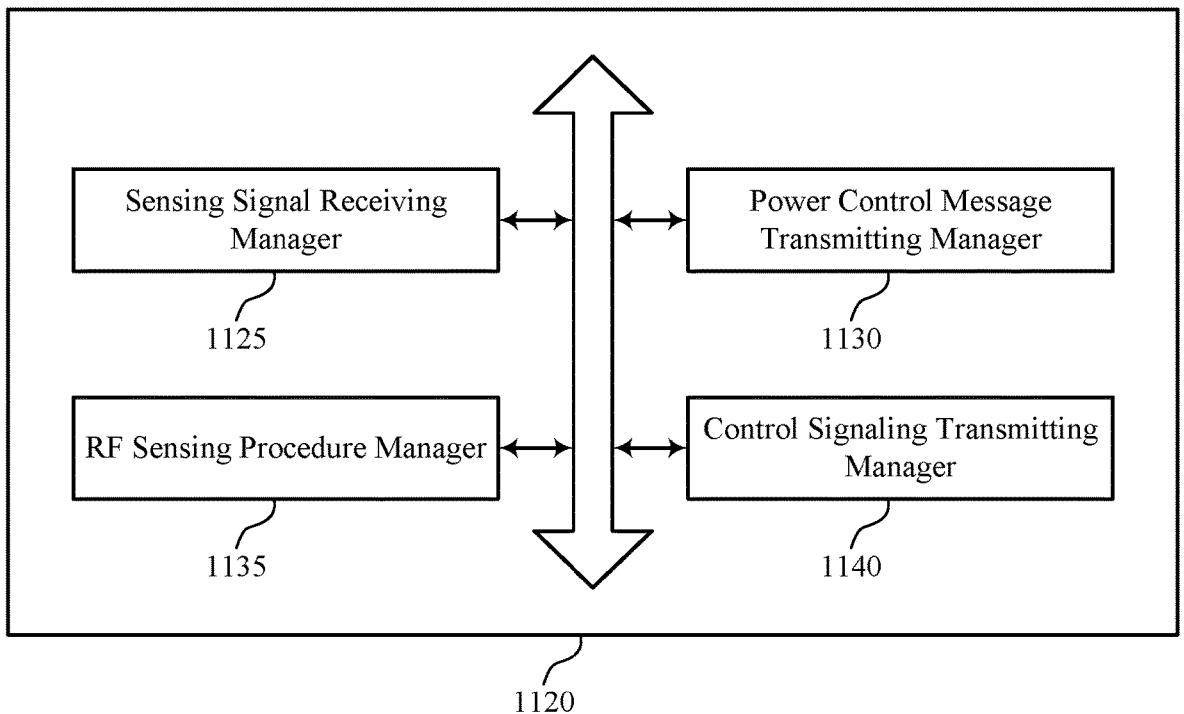
FIG. 11 shows a block diagram of a communications manager that supports power control techniques for cooperative sensing in accordance with one or more aspects of the present disclosure.

FIG. 11 shows a block diagram 1100 of a communications manager 1120 that supports power control techniques for cooperative sensing in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of power control techniques for cooperative sensing as described herein. For example, the communications manager 1120 may include a sensing signal receiving manager 1125, a power control message transmitting manager 1130, an RF sensing procedure manager 1135, a control signaling transmitting manager 1140, or any combination thereof. Each of these components may communicate, directly or indirectly, with one another (e.g., via one or more buses).

The communications manager 1120 may support wireless communication at a base station in accordance with examples as disclosed herein. The sensing signal receiving manager 1125 may be configured as or otherwise support a means for receiving a first sensing signal of a RF sensing procedure. The power control message transmitting manager 1130 may be configured as or otherwise support a means for transmitting, to a UE at least in part in response to the first sensing signal, a power control message for sensing signals to be transmitted by the UE in the RF sensing procedure. In some examples, the sensing signal receiving manager 1125 may be configured as or otherwise support a means for receiving, at least in part in response to the transmitted power control message, a second sensing signal of the RF sensing procedure. The RF sensing procedure manager 1135 may be configured as or otherwise support a means for identifying one or more objects based on receiving the second sensing signal.

In some examples, the power control message transmitting manager 1130 may be configured as or otherwise support a means for transmitting, via the power control message, an indication of the second transmit power, where receiving the second sensing signal is based on the indication of the second transmit power.

In some examples, the power control message transmitting manager 1130 may be configured as or otherwise support a means for transmitting, via the power control message, an indication that the UE is to perform a power ramping procedure for the RF sensing procedure, where receiving the second sensing signal is based on performing the power ramping procedure.

In some examples, the control signaling transmitting manager 1140 may be configured as or otherwise support a means for transmitting, to the UE, control signaling indicating a set of power ramping procedures including the power ramping procedure, where the power ramping procedure is included within the set of power ramping procedures.

In some examples, the power control message transmitting manager 1130 may be configured as or otherwise support a means for transmitting, to the UE, a second power control message indicating that the UE is to stop performing the power ramping procedure. In some examples, the sensing signal receiving manager 1125 may be configured as or otherwise support a means for receiving, at a default transmit power based on the transmitted second power control message, a third sensing signal of the RF sensing procedure.

In some examples, the control signaling transmitting manager 1140 may be configured as or otherwise support a means for transmitting, to the UE, control signaling indicating an initial transmit power, the first transmit power including the initial transmit power.

In some examples, the control signaling transmitting manager 1140 may be configured as or otherwise support a means for transmitting, to the UE, control signaling indicating a path loss model for RF sensing procedures at the UE, where receiving the first sensing signal at the first transmit power is based on the indicated path loss model.

Figure 12:
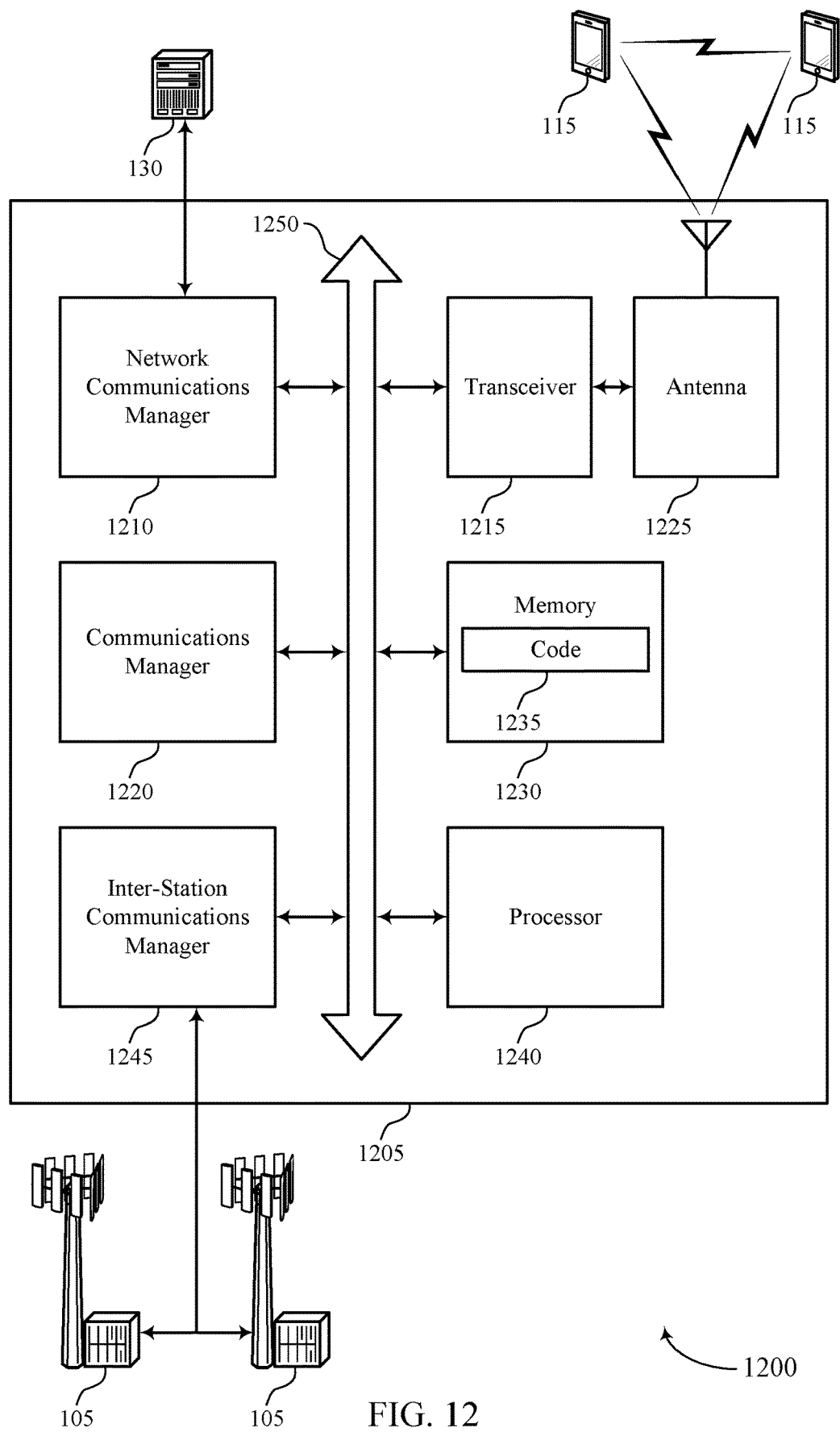
FIG. 12 shows a diagram of a system including a device that supports power control techniques for cooperative sensing in accordance with one or more aspects of the present disclosure.

FIG. 12 shows a diagram of a system 1200 including a device 1205 that supports power control techniques for cooperative sensing in accordance with one or more aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting power control techniques for cooperative sensing). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for receiving a first sensing signal of a RF sensing procedure. The communications manager 1220 may be configured as or otherwise support a means for transmitting, to a UE at least in part in response to the first sensing signal, a power control message for sensing signals to be transmitted by the UE in the RF sensing procedure. The communications manager 1220 may be configured as or otherwise support a means for receiving, at least in part in response to the transmitted power control message, a second sensing signal of the RF sensing procedure. The communications manager 1220 may be configured as or otherwise support a means for identifying one or more objects based on receiving the second sensing signal.

By including or configuring the communications manager 1220 in accordance with examples as described herein, the device 1205 may support techniques for power control techniques for RF sensing procedure. In particular, techniques described herein may enable the UE 115 to determine an initial transmit power for RF sensing procedures via open-loop power control techniques, and may enable the base station 105 to selectively adjust transmit powers of RF sensing procedures via closed-loop power control techniques. By enabling RF sensing procedure power control techniques, aspects of the present disclosure may enable efficient and reliable determination of objects via the RF sensing procedures. Additionally, aspects of the present disclosure may reduce interference within the wireless communications system which is attributable to sensing signals of RF sensing procedures, thereby reducing noise and improving resource utilization within the wireless communications system.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of power control techniques for cooperative sensing as described herein, or the processor 1240 and the memory 1230 may be otherwise configured to perform or support such operations.

Figure 13:
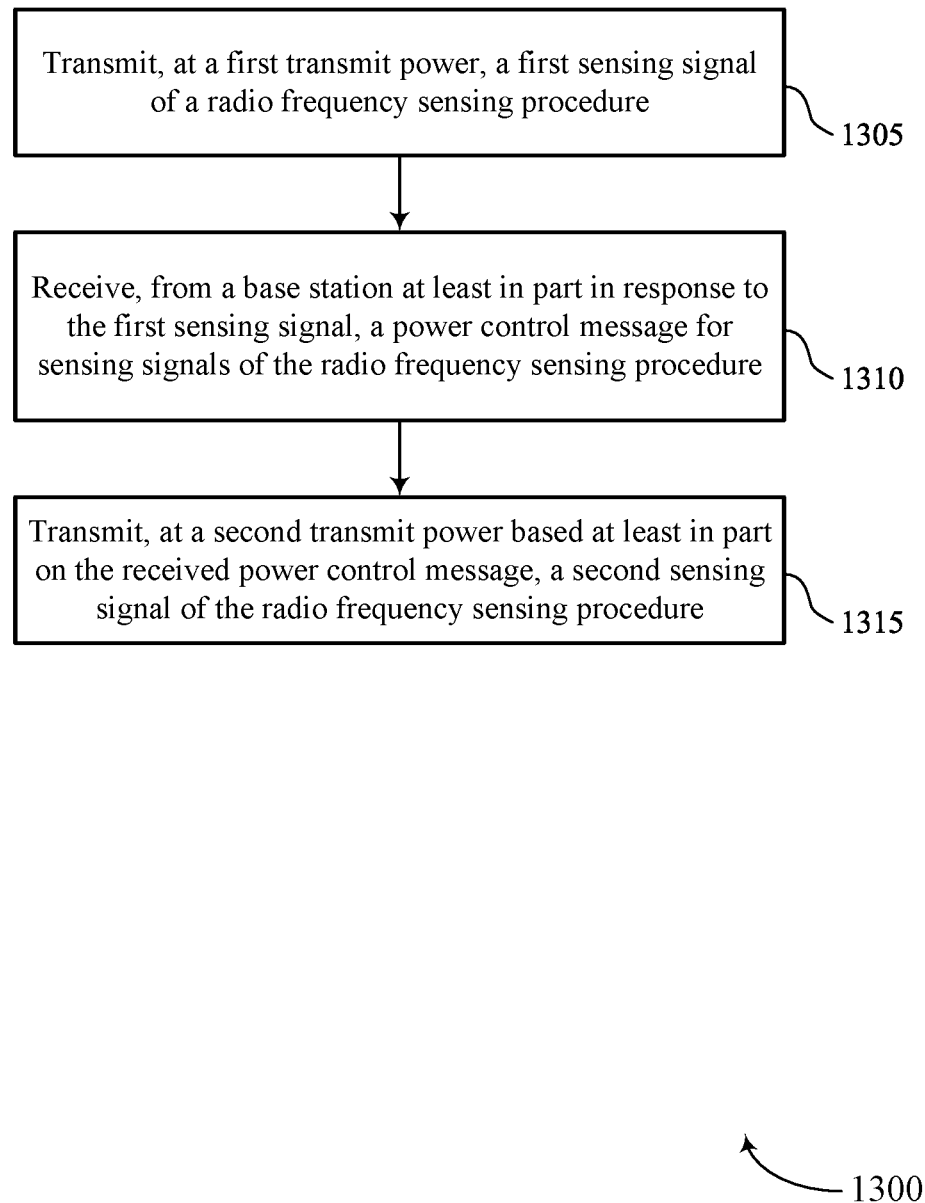
FIGS. 13 through 16 show flowcharts illustrating methods that support power control techniques for cooperative sensing in accordance with one or more aspects of the present disclosure.

FIG. 13 shows a flowchart illustrating a method 1300 that supports power control techniques for cooperative sensing in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting, at a first transmit power, a first sensing signal of a RF sensing procedure. The operations of 1305 may be performed in accordance with examples as disclosed herein. In some examples, aspects of the operations of 1305 may be performed by a sensing signal transmitting manager 725 as described with reference to FIG. 7.

At 1310, the method may include receiving, from a base station at least in part in response to the first sensing signal, a power control message for sensing signals of the RF sensing procedure. The operations of 1310 may be performed in accordance with examples as disclosed herein. In some examples, aspects of the operations of 1310 may be performed by a power control message receiving manager 730 as described with reference to FIG. 7.

At 1315, the method may include transmitting, at a second transmit power based on the received power control message, a second sensing signal of the RF sensing procedure. The operations of 1315 may be performed in accordance with examples as disclosed herein. In some examples, aspects of the operations of 1315 may be performed by a sensing signal transmitting manager 725 as described with reference to FIG. 7.

Figure 14:
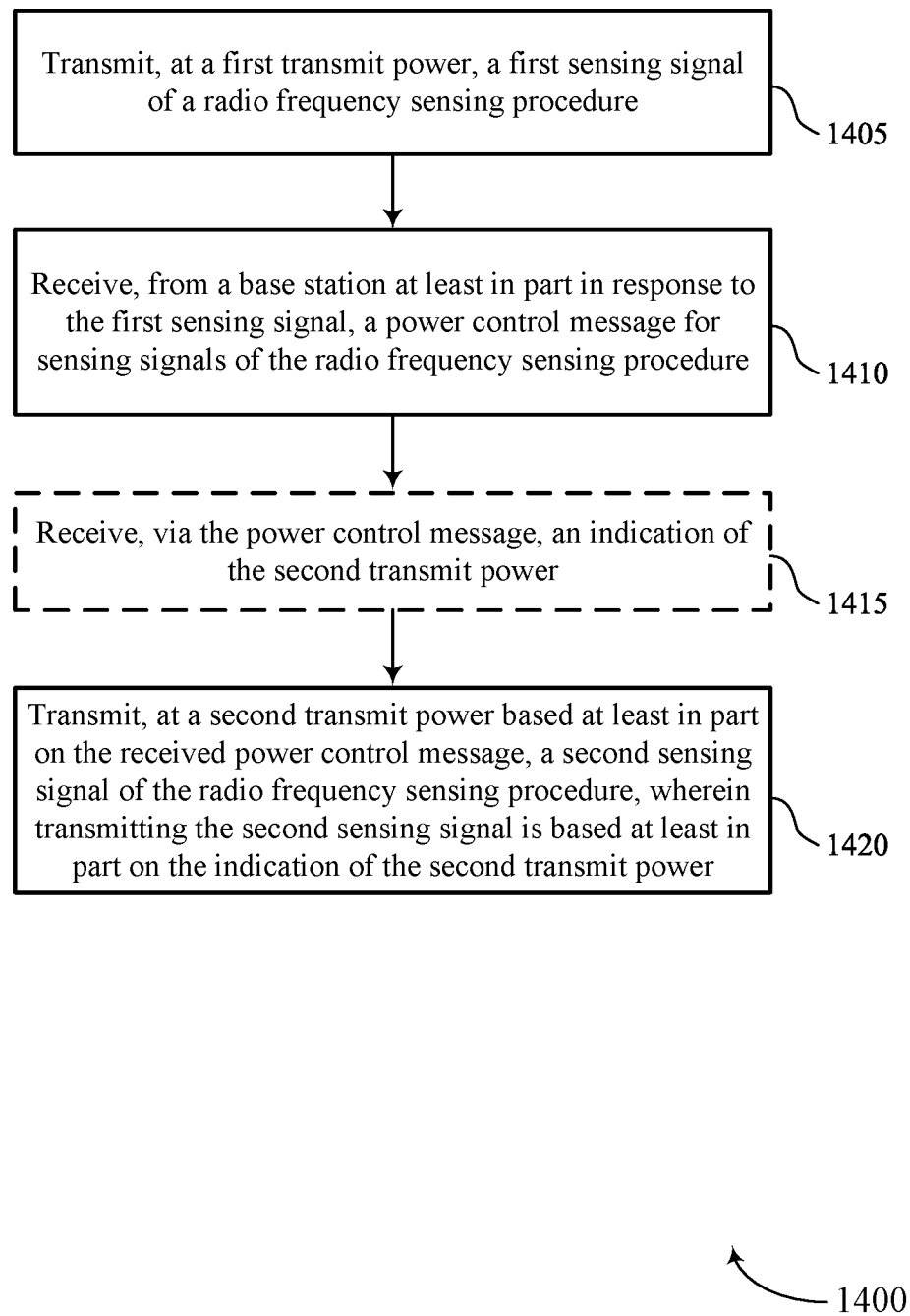

FIG. 14 shows a flowchart illustrating a method 1400 that supports power control techniques for cooperative sensing in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting, at a first transmit power, a first sensing signal of a RF sensing procedure. The operations of 1405 may be performed in accordance with examples as disclosed herein. In some examples, aspects of the operations of 1405 may be performed by a sensing signal transmitting manager 725 as described with reference to FIG. 7.

At 1410, the method may include receiving, from a base station at least in part in response to the first sensing signal, a power control message for sensing signals of the RF sensing procedure. The operations of 1410 may be performed in accordance with examples as disclosed herein. In some examples, aspects of the operations of 1410 may be performed by a power control message receiving manager 730 as described with reference to FIG. 7.

At 1415, the method may include receiving, via the power control message, an indication of the second transmit power. The operations of 1415 may be performed in accordance with examples as disclosed herein. In some examples, aspects of the operations of 1415 may be performed by a power control message receiving manager 730 as described with reference to FIG. 7.

At 1420, the method may include transmitting, at a second transmit power based on the received power control message, a second sensing signal of the RF sensing procedure, where transmitting the second sensing signal is based on the indication of the second transmit power. The operations of 1420 may be performed in accordance with examples as disclosed herein. In some examples, aspects of the operations of 1420 may be performed by a sensing signal transmitting manager 725 as described with reference to FIG. 7.

Figure 15:
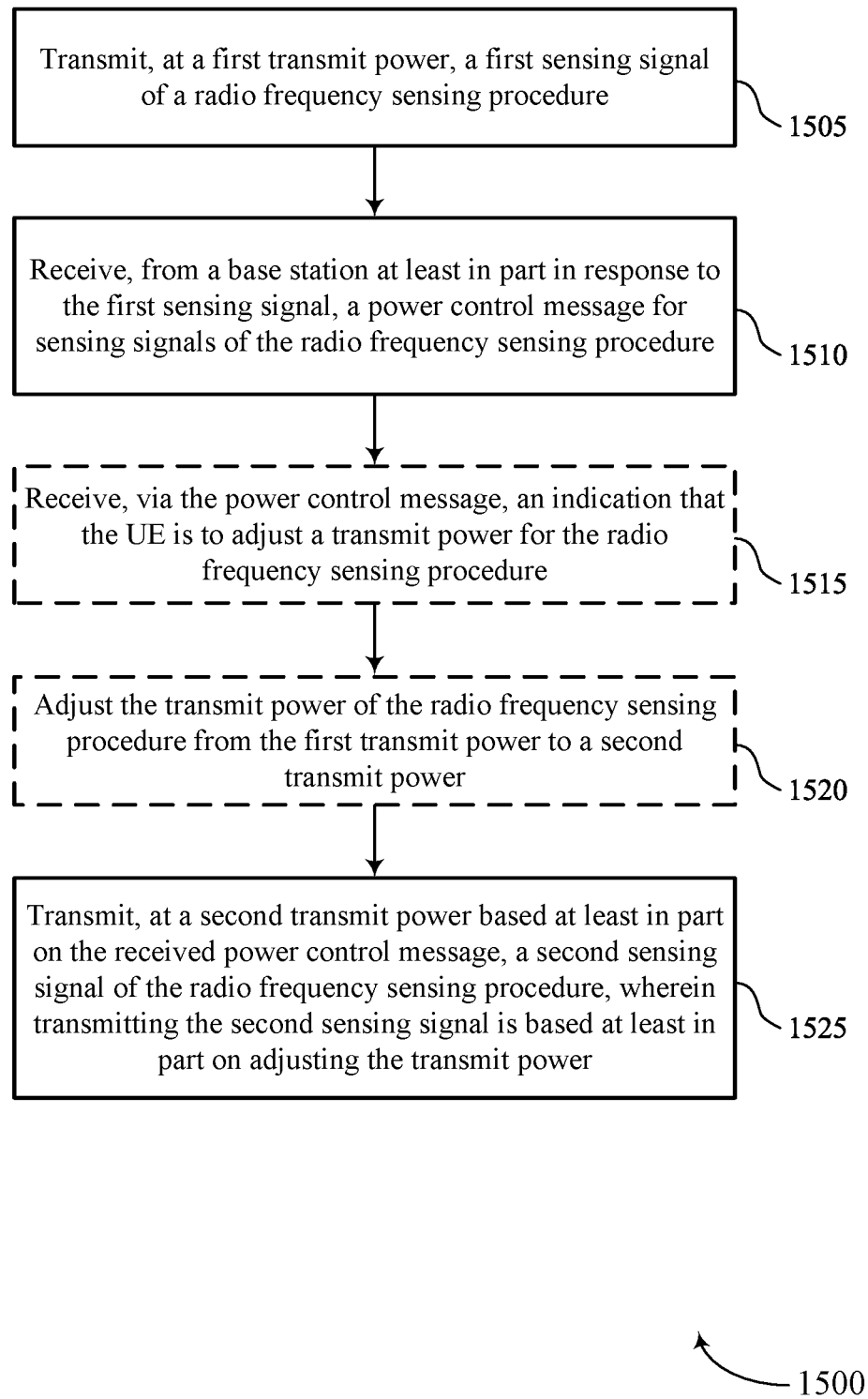

FIG. 15 shows a flowchart illustrating a method 1500 that supports power control techniques for cooperative sensing in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include transmitting, at a first transmit power, a first sensing signal of a RF sensing procedure. The operations of 1505 may be performed in accordance with examples as disclosed herein. In some examples, aspects of the operations of 1505 may be performed by a sensing signal transmitting manager 725 as described with reference to FIG. 7.

At 1510, the method may include receiving, from a base station at least in part in response to the first sensing signal, a power control message for sensing signals of the RF sensing procedure. The operations of 1510 may be performed in accordance with examples as disclosed herein. In some examples, aspects of the operations of 1510 may be performed by a power control message receiving manager 730 as described with reference to FIG. 7.

At 1515, the method may include receiving, via the power control message, an indication that the UE is to adjust a transmit power for the RF sensing procedure. The operations of 1515 may be performed in accordance with examples as disclosed herein. In some examples, aspects of the operations of 1515 may be performed by a power control message receiving manager 730 as described with reference to FIG. 7.

At 1520, the method may include adjusting the transmit power of the RF sensing procedure from the first transmit power to a second transmit power. The operations of 1520 may be performed in accordance with examples as disclosed herein. In some examples, aspects of the operations of 1520 may be performed by a power ramping procedure manager 735 as described with reference to FIG. 7.

At 1525, the method may include transmitting, at a second transmit power based on the received power control message, a second sensing signal of the RF sensing procedure, where transmitting the second sensing signal is based on adjusting the transmit power. The operations of 1525 may be performed in accordance with examples as disclosed herein. In some examples, aspects of the operations of 1525 may be performed by a sensing signal transmitting manager 725 as described with reference to FIG. 7.

Figure 16:
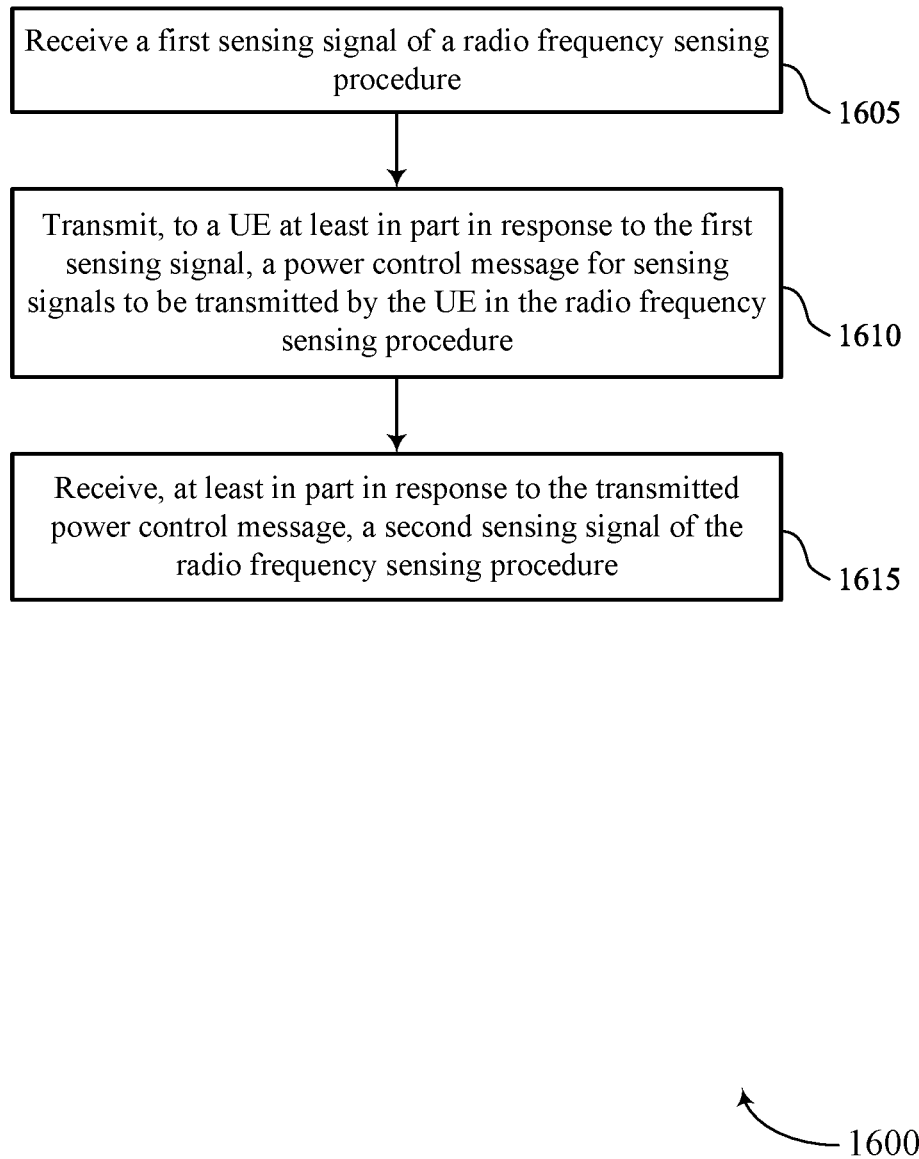

FIG. 16 shows a flowchart illustrating a method 1600 that supports power control techniques for cooperative sensing in accordance with one or more aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include receiving a first sensing signal of a RF sensing procedure. The operations of 1605 may be performed in accordance with examples as disclosed herein. In some examples, aspects of the operations of 1605 may be performed by a sensing signal receiving manager 1125 as described with reference to FIG. 11.

At 1610, the method may include transmitting, to a UE at least in part in response to the first sensing signal, a power control message for sensing signals to be transmitted by the UE in the RF sensing procedure. The operations of 1610 may be performed in accordance with examples as disclosed herein. In some examples, aspects of the operations of 1610 may be performed by a power control message transmitting manager 1130 as described with reference to FIG. 11.

At 1615, the method may include receiving, at least in part in response to the transmitted power control message, a second sensing signal of the RF sensing procedure. The operations of 1615 may be performed in accordance with examples as disclosed herein. In some examples, aspects of the operations of 1615 may be performed by a sensing signal receiving manager 1125 as described with reference to FIG. 11.

The following provides an overview of aspects of the present disclosure:

Aspect 1: A method for wireless communication at a UE, comprising: transmitting, at a first transmit power, a first sensing signal of an RF sensing procedure; receiving, from a base station at least in part in response to the first sensing signal, a power control message for sensing signals of the RF sensing procedure; and transmitting, at a second transmit power based at least in part on the received power control message, a second sensing signal of the RF sensing procedure.

Aspect 2: The method of aspect 1, further comprising: receiving, via the power control message, an indication of the second transmit power, wherein transmitting the second sensing signal is based at least in part on the indication of the second transmit power.

Aspect 3: The method of any of aspects 1 through 2, further comprising: receiving, via the power control message, an indication that the UE is to adjust a transmit power for the RF sensing procedure; and adjusting the transmit power of the RF sensing procedure from the first transmit power to the second transmit power, wherein transmitting the second sensing signal is based at least in part on adjusting the transmit power.

Aspect 4: The method of aspect 3, wherein adjusting the transmit power comprises performing a power ramping procedure to adjust the transmit power of the RF sensing procedure.

Aspect 5: The method of aspect 4, further comprising: receiving, from the base station, control signaling indicating a set of power ramping procedures including the power ramping procedure, wherein the power ramping procedure is included within the set of power ramping procedures.

Aspect 6: The method of any of aspects 4 through 5, wherein the power ramping procedure comprises a fixed power ramping procedure, a linear power ramping procedure, a geometric power ramping procedure, or any combination thereof.

Aspect 7: The method of any of aspects 4 through 6, further comprising: receiving, from the base station, a second power control message indicating that the UE is to stop performing the power ramping procedure; and transmitting, at a default transmit power based at least in part on the received second power control message, a third sensing signal of the RF sensing procedure.

Aspect 8: The method of any of aspects 4 through 7, further comprising: receiving, via the power control message, an indication of a time interval for the power ramping procedure; and performing the power ramping procedure to adjust the transmit power of the RF sensing procedure for at least a portion of the time interval.

Aspect 9: The method of any of aspects 1 through 8, further comprising: receiving, from the base station, control signaling indicating an initial transmit power, the first transmit power comprising the initial transmit power.

Aspect 10: The method of any of aspects 1 through 9, further comprising: receiving, from the base station, control signaling indicating a path loss model for RF sensing procedures at the UE, wherein transmitting the first sensing signal at the first transmit power is based at least in part on the indicated path loss model.

Aspect 11: The method of aspect 10, further comprising: receiving a reference signal from the base station; performing a channel estimation procedure based at least in part on the received reference signal and in accordance with the indicated path loss model; and determining the first transmit power based at least in part on performing the channel estimation procedure.

Aspect 12: The method of any of aspects 1 through 11, further comprising: determining the first transmit power based at least in part on a target range of one or more objects detected via the RF sensing procedure.

Aspect 13: The method of any of aspects 1 through 12, further comprising: receiving, via the power control message, an indication of one or more beams of the UE, wherein transmitting the second sensing signal comprises transmitting the second sensing signal using at least a subset of the one or more beams based at least in part on the indication of the one or more beams.

Aspect 14: The method of any of aspects 1 through 13, further comprising: receiving, from the base station, control signaling indicating one or more parameters for the RF sensing procedure, wherein transmitting the first sensing signal, transmitting the second sensing signal, or both, is based at least in part on the one or more parameters.

Aspect 15: The method of aspect 14, wherein the one or more parameters comprise a bandwidth for the sensing signals of the RF sensing procedure, a set of one or more sensing occasions for the sensing signals of the RF sensing procedure, a set of one or more pulse repetition intervals for the RF sensing procedure, a time interval for the RF sensing procedure, a maximum transmission power for the sensing signals of the RF sensing procedure, a target range for one or more objects detected via the RF sensing procedure, a location of the one or more objects, or any combination thereof.

Aspect 16: A method for wireless communication at a base station, comprising: receiving a first sensing signal of an RF sensing procedure; transmitting, to a UE at least in part in response to the first sensing signal, a power control message for sensing signals to be transmitted by the UE in the RF sensing procedure; and receiving, at least in part in response to the transmitted power control message, a second sensing signal of the RF sensing procedure.

Aspect 17: The method of aspect 16, further comprising: transmitting, via the power control message, an indication of the second transmit power, wherein receiving the second sensing signal is based at least in part on the indication of the second transmit power.

Aspect 18: The method of any of aspects 16 through 17, further comprising: transmitting, via the power control message, an indication that the UE is to adjust a transmit power for the RF sensing procedure, wherein receiving the second sensing signal is based at least in part on transmitting the indication.

Aspect 19: The method of any of aspect 18, further comprising: transmitting, via the power control message, an indication that the UE is to perform a power ramping procedure to adjust the transmit power for the RF sensing procedure.

Aspect 20: The method of aspect 19, further comprising: transmitting, to the UE, control signaling indicating a set of power ramping procedures including the power ramping procedure, wherein the power ramping procedure is included within the set of power ramping procedures.

Aspect 21: The method of any of aspects 19 through 20, further comprising: transmitting, to the UE, a second power control message indicating that the UE is to stop performing the power ramping procedure; and receiving, at a default transmit power based at least in part on the transmitted second power control message, a third sensing signal of the RF sensing procedure.

Aspect 22: The method of any of aspects 16 through 21, further comprising: transmitting, to the UE, control signaling indicating an initial transmit power, the first transmit power comprising the initial transmit power.

Aspect 23: The method of any of aspects 16 through 22, further comprising: transmitting, to the UE, control signaling indicating a path loss model for RF sensing procedures at the UE, wherein receiving the first sensing signal at the first transmit power is based at least in part on the indicated path loss model.

Aspect 24: The method of any of aspects 16 through 23, further comprising: identifying one or more objects based at least in part on receiving the second sensing signal.

Aspect 25: An apparatus for wireless communication at a UE, comprising a processor; and memory coupled to the processor, the processor and memory configured to perform a method of any of aspects 1 through 15.

Aspect 26: An apparatus for wireless communication at a UE, comprising at least one means for performing a method of any of aspects 1 through 15.

Aspect 27: A non-transitory computer-readable medium storing code for wireless communication at a UE, the code comprising instructions executable by a processor to perform a method of any of aspects 1 through 15.

Aspect 28: An apparatus for wireless communication at a base station, comprising a processor; and memory coupled to the processor, the processor and memory configured to perform a method of any of aspects 16 through 24.

Aspect 29: An apparatus for wireless communication at a base station, comprising at least one means for performing a method of any of aspects 16 through 24.

Aspect 30: A non-transitory computer-readable medium storing code for wireless communication at a base station, the code comprising instructions executable by a processor to perform a method of any of aspects 16 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Further, the term "set" may be considered to include any quantity of members (e.g., 0, 1, 2, 3, etc.), unless specified otherwise herein.

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
    one or more memories storing processor-executable code; and
    one or more processors coupled with the one or more memories and individually or collectively operable to execute the code to cause the UE to:
        receive, from a network entity, control signaling indicating one or more of:
            an initial transmit power to be used to transmit a first sensing signal of a radio frequency sensing procedure for detecting one or more objects, or
            a path loss model to be used to determine the initial transmit power;
        transmit, at the initial transmit power, the first sensing signal of the radio frequency sensing procedure;
        receive, from the network entity at least in part in response to the first sensing signal, a power control message for sensing signals of the radio frequency sensing procedure; and
        transmit, at a second transmit power based at least in part on the received power control message, a second sensing signal of the radio frequency sensing procedure.

2. The UE of claim 1, wherein the one or more processors are individually or collectively further operable to execute the code to cause the UE to:
    receive, via the power control message, an indication of the second transmit power, wherein transmitting the second sensing signal is based at least in part on the indication of the second transmit power.

3. The UE of claim 1, wherein the one or more processors are individually or collectively further operable to execute the code to cause the UE to:

receive, via the power control message, an indication that the UE is to adjust a transmit power for the radio frequency sensing procedure; and adjusting the transmit power of the radio frequency sensing procedure from the initial transmit power to the second transmit power, wherein transmitting the second sensing signal is based at least in part on adjusting the transmit power.

4. The UE of claim 3, wherein, to adjust the transmit power, the one or more processors are individually or collectively operable to execute the code to cause the UE to:
perform a power ramping procedure to adjust the transmit power of the radio frequency sensing procedure.

5. The UE of claim 4, wherein the control signaling further indicates a set of power ramping procedures including the power ramping procedure, wherein performing the power ramping procedure is based at least in part on receiving the control signaling.

6. The UE of claim 4, wherein the power ramping procedure comprises a fixed power ramping procedure, a linear power ramping procedure, a geometric power ramping procedure, or any combination thereof.

7. The UE of claim 4, wherein the one or more processors are individually or collectively further operable to execute the code to cause the UE to:
receive, from the network entity, a second power control message indicating that the UE is to stop performing the power ramping procedure; and
transmit, at a default transmit power based at least in part on the received second power control message, a third sensing signal of the radio frequency sensing procedure.

8. The UE of claim 4, wherein the one or more processors are individually or collectively further operable to execute the code to cause the UE to:
receive, via the power control message, an indication of a time interval for the power ramping procedure; and
perform the power ramping procedure to adjust the transmit power of the radio frequency sensing procedure for at least a portion of the time interval.

9. The UE of claim 1, wherein
the first sensing signal transmitted at the initial transmit power is based at least in part on the indicated initial transmit power.

10. The UE of claim 1, wherein the first sensing signal transmitted at the initial transmit power is based at least in part on the indicated path loss model.

11. The UE of claim 1, wherein the one or more processors are individually or collectively further operable to execute the code to cause the UE to:
receive a reference signal from the network entity;
perform a channel estimation procedure based at least in part on the received reference signal and in accordance with the indicated path loss model; and
determine the initial transmit power to be used to transmit the first sensing signal further based at least in part on performing the channel estimation procedure.

12. The UE of claim 1, wherein the one or more processors are individually or collectively further operable to execute the code to cause the UE to:
determine the initial transmit power to be used to transmit the first sensing signal further based at least in part on a target range of the one or more objects detected via the radio frequency sensing procedure.

13. The UE of claim 1, wherein the one or more processors are individually or collectively further operable to execute the code to cause the UE to:

receive, via the power control message, an indication of one or more beams of the UE, wherein transmitting the second sensing signal comprises transmitting the second sensing signal using at least a subset of the one or more beams based at least in part on the indication of the one or more beams.

14. The UE of claim 1, wherein the control signaling further indicates one or more parameters for the radio frequency sensing procedure, and
wherein transmitting the first sensing signal, transmitting the second sensing signal, or both, is based at least in part on the one or more parameters.

15. The UE of claim 14, wherein the one or more parameters comprise a bandwidth for the sensing signals of the radio frequency sensing procedure, a set of one or more sensing occasions for the sensing signals of the radio frequency sensing procedure, a set of one or more pulse repetition intervals for the radio frequency sensing procedure, a time interval for the radio frequency sensing procedure, a maximum transmission power for the sensing signals of the radio frequency sensing procedure, a target range for the one or more objects detected via the radio frequency sensing procedure, a location of the one or more objects, or any combination thereof.

16. A network entity for wireless communication, comprising:
one or more memories storing processor-executable code; and
one or more processors coupled with the one or more memories and individually or collectively operable to execute the code to cause the network entity to:
transmit, to a user equipment (UE), control signaling indicating one or more of:
an initial transmit power to be used transmit a first sensing signal of a radio frequency sensing procedure for detecting one or more objects, or
a path loss model to be used to determine the initial transmit power;
receive the first sensing signal of the radio frequency sensing procedure transmitted at the initial transmit power;
transmit, to the UE at least in part in response to the first sensing signal, a power control message for sensing signals to be transmitted by the UE in the radio frequency sensing procedure; and
receive, at least in part in response to the transmitted power control message, a second sensing signal of the radio frequency sensing procedure.

17. The network entity of claim 16, wherein the one or more processors are individually or collectively further operable to execute the code to cause the network entity to:
transmit, via the power control message, an indication of a second transmit power different from the initial transmit power, wherein receiving the second sensing signal is based at least in part on the indication of the second transmit power.

18. The network entity of claim 16, wherein the one or more processors are individually or collectively further operable to execute the code to cause the network entity to:
transmit, via the power control message, an indication that the UE is to adjust a transmit power for the radio frequency sensing procedure, wherein receiving the second sensing signal is based at least in part on transmitting the indication.

19. The network entity of claim 18, wherein, to transmit the indication that the UE is to adjust the transmit power, the one or more processors are individually or collectively operable to execute the code to cause the network entity to:

transmit, via the power control message, an indication that the UE is to perform a power ramping procedure to adjust the transmit power for the radio frequency sensing procedure.

20. The network entity of claim 19, wherein the control signaling further indicates a set of power ramping procedures including the power ramping procedure, and wherein receiving the second sensing signal is based at least in part on transmitting the control signaling.

21. The network entity of claim 19, wherein the one or more processors are individually or collectively further operable to execute the code to cause the network entity to:

transmit, to the UE, a second power control message indicating that the UE is to stop performing the power ramping procedure; and receive, at a default transmit power based at least in part on the transmitted second power control message, a third sensing signal of the radio frequency sensing procedure.

22. The network entity of claim 16, wherein the first sensing signal is based at least in part on the indicated initial transmit power.

23. The network entity of claim 16, wherein the first sensing signal is based at least in part on the indicated path loss model.

24. The network entity of claim 16, wherein the one or more processors are individually or collectively further operable to execute the code to cause the network entity to:

identify the one or more objects based at least in part on receiving the second sensing signal.

25. A method for wireless communication by a user equipment (UE), comprising:

receiving, from a network entity, control signaling indicating one or more of:
an initial transmit power to be used to transmit a first sensing signal of a radio frequency sensing procedure for detecting one or more objects, or
a path loss model to be used to determine the initial transmit power;

transmitting, at the initial transmit power, the first sensing signal of the radio frequency sensing procedure;

receiving, from the network entity at least in part in response to the first sensing signal, a power control message for sensing signals of the radio frequency sensing procedure; and transmitting, at a second transmit power based at least in part on the received power control message, a second sensing signal of the radio frequency sensing procedure.

26. The method of claim 25, further comprising:

receiving, via the power control message, an indication of the second transmit power, wherein transmitting the second sensing signal is based at least in part on the indication of the second transmit power.

27. The method of claim 25, further comprising:

receiving, via the power control message, an indication that the UE is to adjust a transmit power for the radio frequency sensing procedure; and adjusting the transmit power of the radio frequency sensing procedure from the initial transmit power to the second transmit power, wherein transmitting the second sensing signal is based at least in part on adjusting the transmit power.

28. A method for wireless communication by a network entity, comprising:

transmitting, to a user equipment (UE), control signaling indicating one or more of:
an initial transmit power to be used to transmit a first sensing signal of a radio frequency sensing procedure for detecting one or more objects, or
a path loss model to be used to determining the initial transmit power;

receiving the first sensing signal of the radio frequency sensing procedure transmitted at the initial transmit power;

transmitting, to the UE at least in part in response to the first sensing signal, a power control message for sensing signals to be transmitted by the UE in the radio frequency sensing procedure; and receiving, at least in part in response to the transmitted power control message, a second sensing signal of the radio frequency sensing procedure.

29. The method of claim 28, wherein the method further comprising:

transmitting, via the power control message, an indication of a second transmit power different from the initial transmit power, wherein receiving the second sensing signal is based at least in part on the indication of the second transmit power.

30. The method of claim 28, further comprising:

transmitting, via the power control message, an indication that the UE is to adjust the initial transmit power for the radio frequency sensing procedure, wherein receiving the second sensing signal is based at least in part on transmitting the indication.

* * * * *